(12) United States Patent
Ikenaga et al.

(10) Patent No.: US 9,011,714 B2
(45) Date of Patent: Apr. 21, 2015

(54) LIQUID CRYSTAL COMPOSITION, LIQUID CRYSTAL ELEMENT, AND LIQUID CRYSTAL DISPLAY DEVICE

(75) Inventors: Makoto Ikenaga, Kanagawa (JP);
Daisuke Kubota, Kanagawa (JP);
Takahiro Yamamoto, Kanagawa (JP);
Sachiko Kawakami, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/464,532

(22) Filed: May 4, 2012

(65) Prior Publication Data

US 2012/0286198 A1    Nov. 15, 2012

(30) Foreign Application Priority Data

May 9, 2011    (JP) ................. 2011-104494

(51) Int. Cl.
| | | |
|---|---|---|
| C09K 19/54 | (2006.01) | |
| C09K 19/52 | (2006.01) | |
| C09K 19/00 | (2006.01) | |
| C09K 19/02 | (2006.01) | |
| G02F 1/1333 | (2006.01) | |
| C09K 19/20 | (2006.01) | |
| C09K 19/58 | (2006.01) | |
| C09K 19/04 | (2006.01) | |

(52) U.S. Cl.
CPC ......... *C09K 19/0275* (2013.01); *C09K 19/2007* (2013.01); *C09K 19/586* (2013.01); *C09K 19/588* (2013.01); *C09K 2019/0448* (2013.01)

(58) Field of Classification Search
USPC ............... 252/299.01, 299.5; 428/1.1, 1.3; 349/86, 182, 183
See application file for complete search history.

(56) References Cited

U.S. PATENT DOCUMENTS

| 7,576,829 B2 | 8/2009 | Kikuchi et al. |
| 7,648,647 B2 | 1/2010 | Kikuchi et al. |
| 8,372,307 B2 * | 2/2013 | Farrand et al. ........... 252/299.63 |
| 2008/0049319 A1 | 2/2008 | Kato et al. |
| 2008/0291369 A1 | 11/2008 | Nagai et al. |
| 2012/0286201 A1 * | 11/2012 | Ikenaga et al. ........... 252/299.64 |

FOREIGN PATENT DOCUMENTS

| JP | 3779937 | 5/2006 |
| JP | 2008-050440 | 3/2008 |
| JP | 2008-303381 | 12/2008 |
| JP | 2009-080450 | 4/2009 |
| JP | 2009-265597 | 11/2009 |
| JP | 2009-300917 | 12/2009 |
| JP | 2010-085534 | 4/2010 |
| WO | WO 2005-090520 A1 | 9/2005 |

* cited by examiner

*Primary Examiner* — Geraldina Visconti
(74) *Attorney, Agent, or Firm* — Nixon Peabody LLP; Jeffrey L. Costellia

(57) ABSTRACT

An object is to provide a novel liquid crystal composition that can be used for a variety of liquid crystal devices. Particularly, a novel liquid crystal composition is used to achieve a reduction in driving voltage of a liquid crystal element and a reduction in power consumption of a liquid crystal display device. The liquid crystal composition includes a polymerizable monomer represented by the general formula (G1), a nematic liquid crystal, and a chiral agent. In the general formula (G1), n and m are individually an integer from 1 to 20, and $R^1$ and $R^2$ individually represent hydrogen or a methyl group.

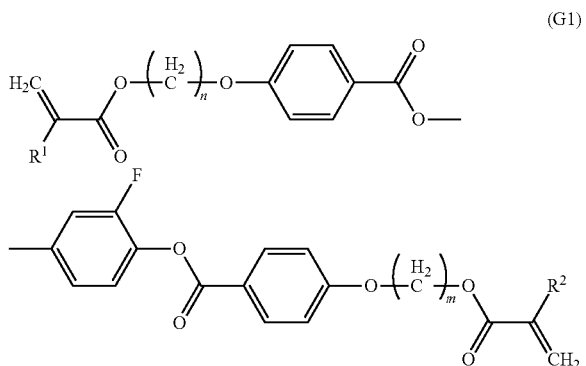

(G1)

12 Claims, 16 Drawing Sheets

LIQUID CRYSTAL COMPOSITION, LIQUID CRYSTAL ELEMENT, AND LIQUID CRYSTAL DISPLAY DEVICE

BACKGROUND OF THE INVENTION

1. Field of the Invention

The present invention relates to a liquid crystal composition, a liquid crystal element, and a liquid crystal display device, and manufacturing methods thereof.

2. Description of the Related Art

In recent years, liquid crystal has been applied to a variety of devices; in particular, a liquid crystal display device (liquid crystal display) having advantages of thinness and lightness has been used for displays in a wide range of fields.

For a larger and higher-resolution display screen, shorter response time of liquid crystal has been required, and development thereof has been advanced (for example, see Patent Document 1).

As a display mode of liquid crystal capable of quick response, a display mode using liquid crystal exhibiting a blue phase is given. The mode using liquid crystal exhibiting a blue phase achieves quick response, does not require an alignment film, and provides a wide viewing angle, and thus has been developed more actively for practical use (for example, see Patent Document 2).

REFERENCE

Patent Document

[Patent Document 1] Japanese Published Patent Application no. 2008-303381

[Patent Document 2] PCT International Publication no. 2005-090520

SUMMARY OF THE INVENTION

An object is to provide a novel liquid crystal composition that can be used for a variety of liquid crystal devices.

Another object is to achieve a reduction in driving voltage of a liquid crystal element and a reduction in power consumption of a liquid crystal display device with the use of the novel liquid crystal composition.

As an embodiment of the present invention, a liquid crystal composition including a polymerizable monomer represented by the general formula (G1), a nematic liquid crystal, and a chiral agent is provided.

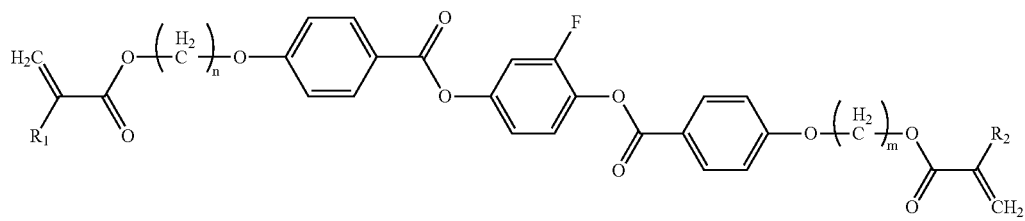

(G1)

In the general formula (G1), n and m are individually an integer from 1 to 20, and $R^1$ and $R^2$ individually represent hydrogen or a methyl group.

As another embodiment or the present invention, a liquid crystal composition including a polymerizable monomer represented by the general formula (G2), a nematic liquid crystal, and a chiral agent is provided.

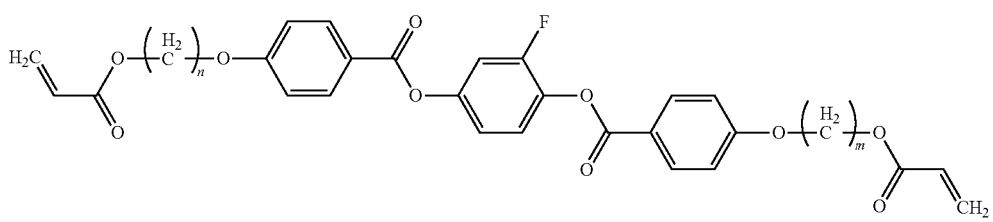

(G2)

In the general formula (G2), n and m are individually an integer from 1 to 20.

As another embodiment of the present invention, a liquid crystal composition including a polymerizable monomer represented by the general formula (G3), a nematic liquid crystal, and a chiral agent is provided.

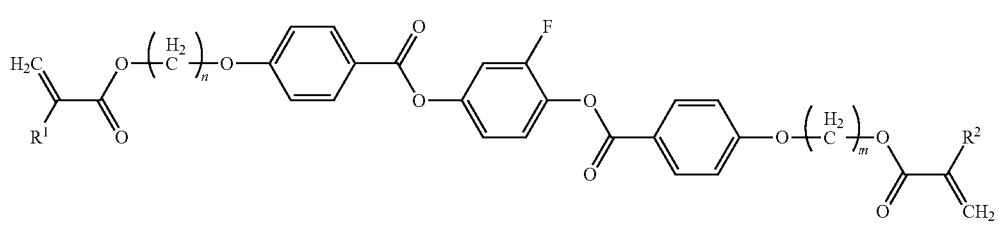

(G3)

In the general formula (G3), n and m are individually an integer from 1 to 20 and n=m, and $R^1$ and $R^2$ individually represent hydrogen or a methyl group.

As another embodiment of the present invention, a liquid crystal composition including a polymerizable monomer represented by the general formula (G4), a nematic liquid crystal, and a chiral agent is provided.

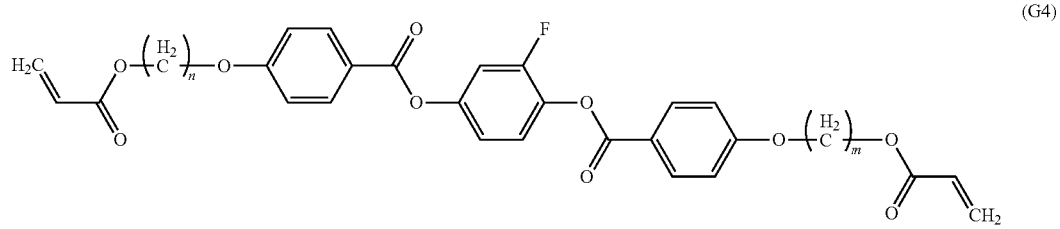

(G4)

In the general formula (G4), n and m are individually an integer from 1 to 20 and n=m.

As another embodiment of the present invention, a liquid crystal composition including a polymerizable monomer represented by the general formula (G5), a nematic liquid crystal, and a chiral agent is provided.

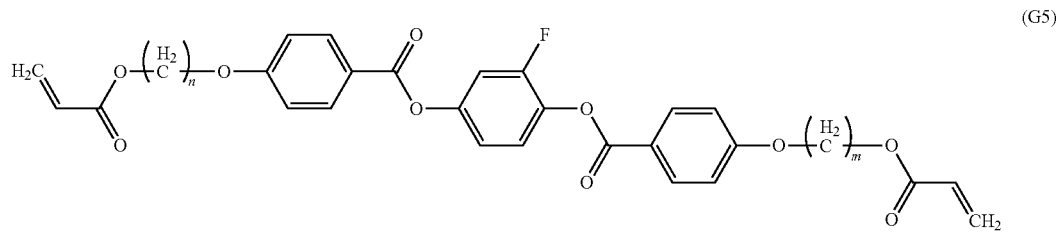

(G5)

In the general formula (G5), n and m are individually an even integer from 2 to 20.

As of the present invention is a liquid crystal composition including a polymerizable monomer represented by the general formula (G6), a nematic liquid crystal, and a chiral agent.

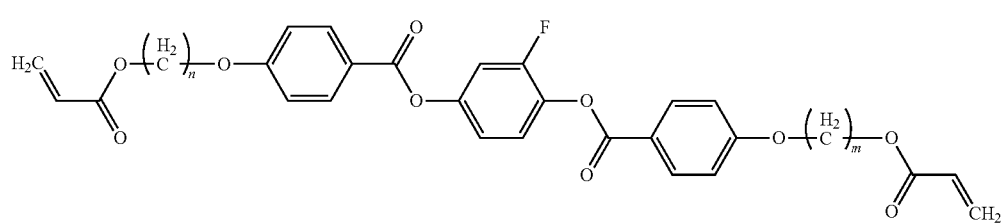

(G6)

In the general formula (G6), n and m are individually an even integer from 2 to 20 and n=m.

According to another embodiment of the present invention, a liquid crystal composition exhibiting a blue phase is provided as the above liquid crystal composition.

As another embodiment of the present invention, a liquid crystal element, a liquid crystal display device, or an electronic apparatus in which the above liquid crystal composition is used is provided.

According to the embodiment of the present invention, a novel liquid crystal composition including the polymerizable monomer represented by the general formula (G1), a nematic liquid crystal, and a chiral agent can be provided.

According to the embodiment of the present invention, a novel liquid crystal composition including the polymerizable monomer represented by the general formula (G1), a nematic liquid Crystal, and a chiral agent and exhibiting a blue phase can be provided.

According to the embodiment of the present invention, a liquid crystal element, a liquid crystal display device, or an electronic apparatus with lower driving voltage and lower power consumption can be provided with the use of the liquid crystal composition.

BRIEF DESCRIPTION OF THE DRAWINGS

In the accompanying drawings:

FIGS. 4A1, 4A2, and 4B are views illustrating a liquid crystal display module;

DETAILED DESCRIPTION OF THE INVENTION

Figure 1A:
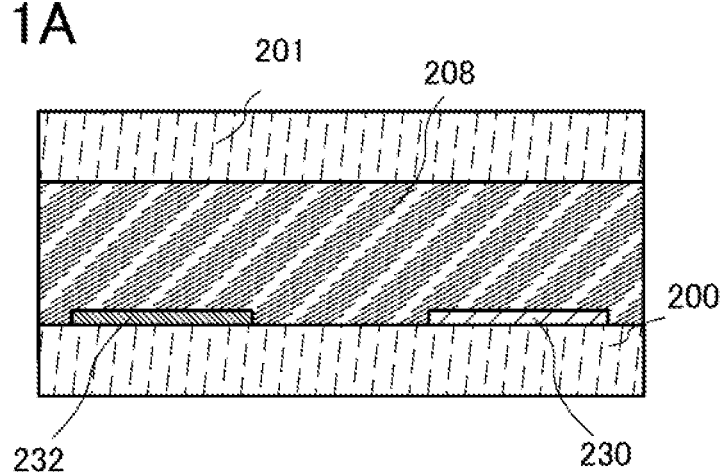
FIGS. 1A and 1B each show an example of a liquid crysal element and a liquid crystal display device.

Embodiments and Examples of the present invention will be described in detail with reference to the accompanying drawings. Note that the present invention is not limited to the following description, and it will be easily understood by those skilled in the art that modes and details can be modified in various ways without departing from the spirit and scope of the present invention. Therefore, the present invention should not be construed as being limited to the description in the following embodiments and examples. In the structures described below, the same portions or portions having similar functions are denoted by the same reference numerals in different drawings, and explanation thereof will not be repeated.

Note that the ordinal numbers such as "first", "second", and "third" in this specification are used for convenience and do not denote the order of steps and the stacking order of layers. In addition, the ordinal numbers in this specification do not denote particular names which specify the present invention.

(Embodiment 1)

Figure 1B:
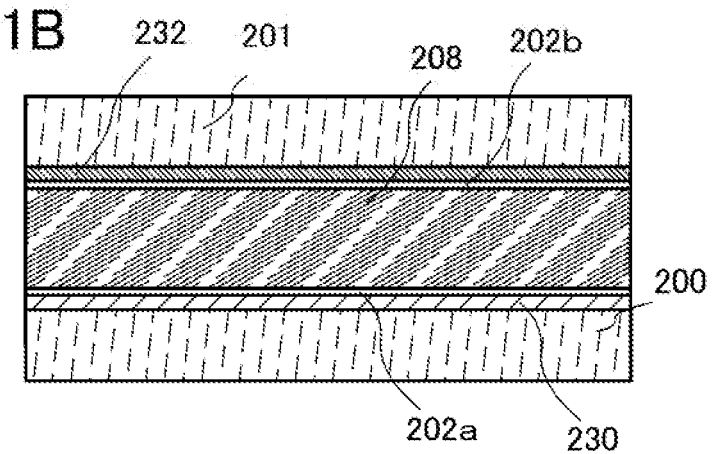

A liquid crystal composition according to an embodiment of the present invention, a liquid crystal element, and a liquid crystal display device including the liquid crystal composition will be described with reference to FIGS. 1A and 1B. FIGS. 1A and 1B are each a cross-sectional view of a liquid crystal element and a liquid crystal display device.

The liquid crystal composition according to an embodiment of the present invention is a liquid crystal composition including the polymerizable monomer represented by the general formula (G1), a nematic liquid crystal, and a chiral agent.

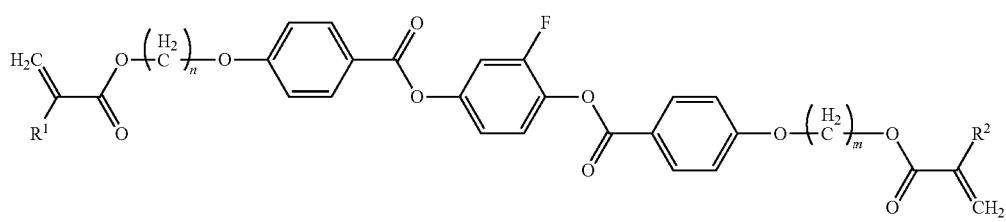

(G1)

In the general formula (G1), n and m are individually an integer from 1 to 20, and $R^1$ and $R^2$ individually represent hydrogen or a methyl group.

A liquid crystal composition according to another embodiment of the present invention is a liquid crystal composition including the polymerizable monomer represented by the general formula (G2), a nematic liquid crystal, and a chiral agent.

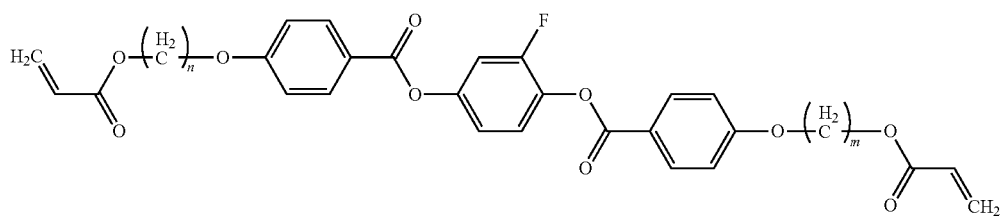

(G2)

In the general formula (G2), n and m are individually an integer from 1 to 20.

A liquid crystal composition according to another embodiment of the present invention is a liquid crystal composition including the polymerizable monomer represented by the general formula (G3), a nematic liquid crystal, and a chiral agent.

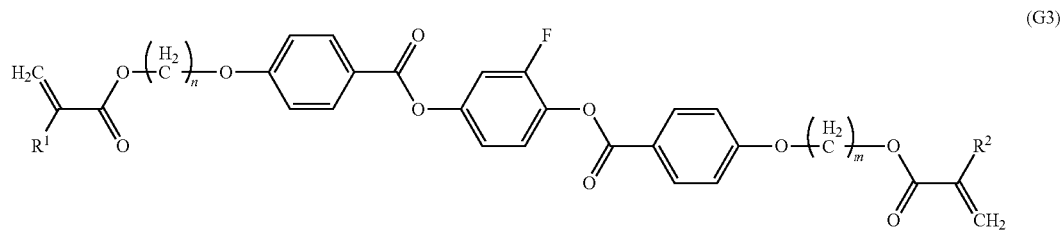

(G3)

In the general formula (G3), n and m are individually an integer from 1 to 20 and n=m, and $R^1$ and $R^2$ individually represent hydrogen or a methyl group.

A liquid crystal composition according to another embodiment of the present invention is a liquid crystal composition including the polymerizable monomer represented by the general formula (G4), a nematic liquid crystal, and a chiral agent.

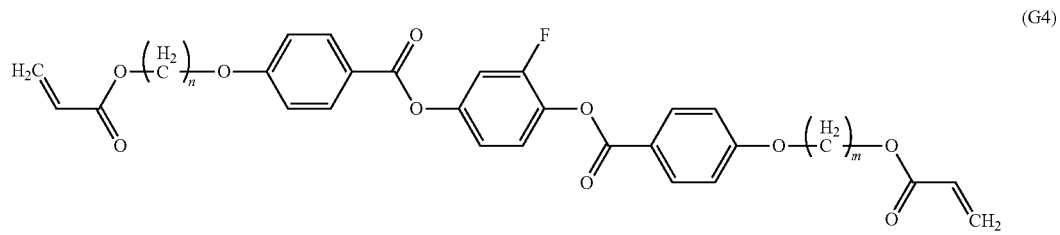

(G4)

In the general formula (G4), n and m are individually an integer from 1 to 20 and n=m.

A liquid crystal composition according to another embodiment of the present invention is a liquid crystal composition including the polymerizable monomer represented by the general formula (G5), a nematic liquid crystal, and a chiral agent.

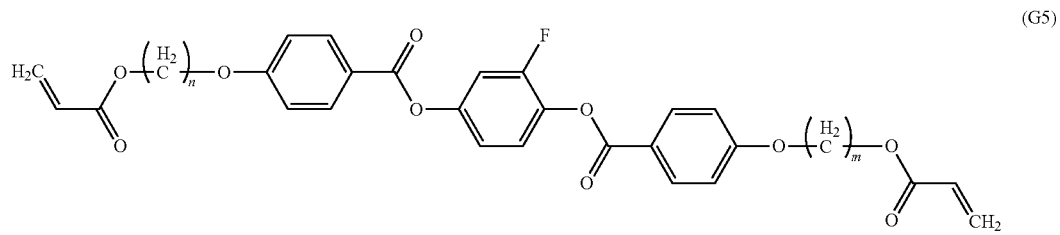

(G5)

In the general formula (G5), n and m are individually an even integer from 2 to 20.

A liquid crystal composition according to another embodiment of the present invention is a liquid crystal composition including the polymerizable monomer represented by the general formula (G6), a nematic liquid crystal, and a chiral agent.

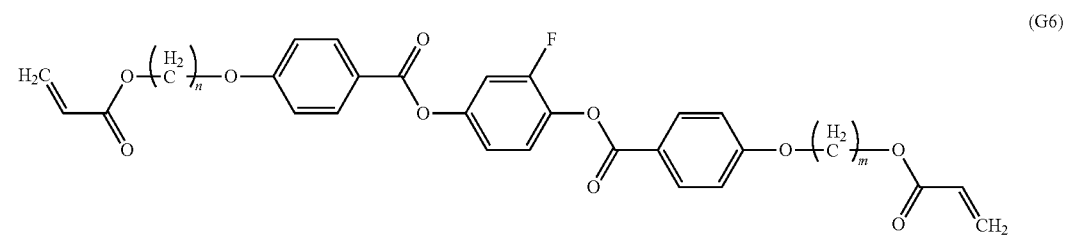

(G6)

In the general formula (G6), n and m are individually an even integer from 2 to 20 and n=m.
Specific examples of polymerizable monomers represented by the general formula (G1) include polymerizable monomers represented by the structural formulae (100) to (144). Note that the present invention is not limited thereto.
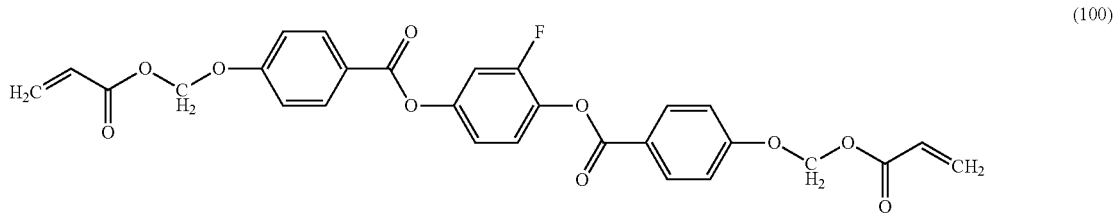
(100)
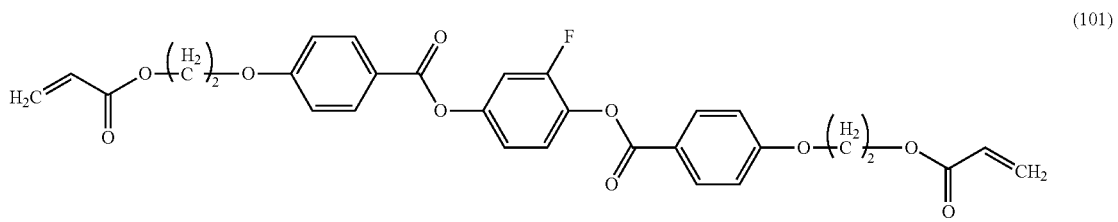
(101)
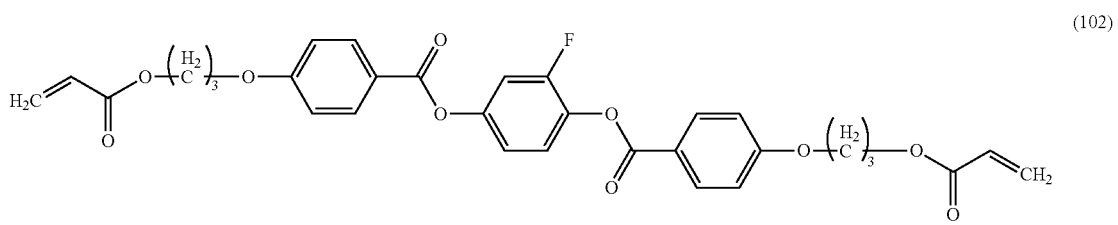
(102)
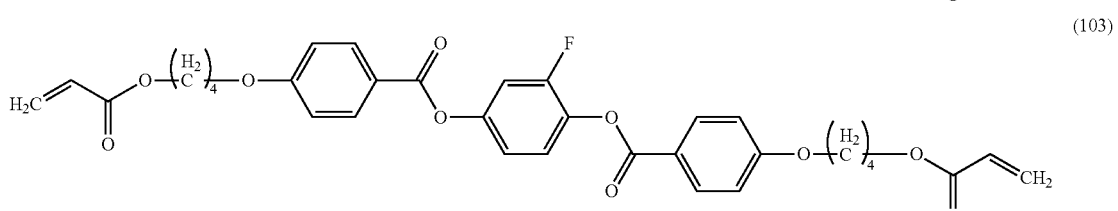
(103)
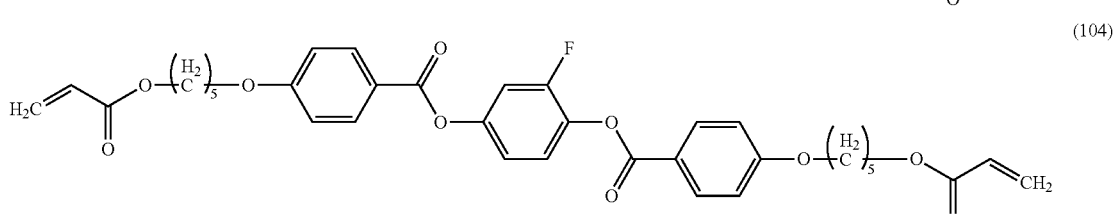
(104)
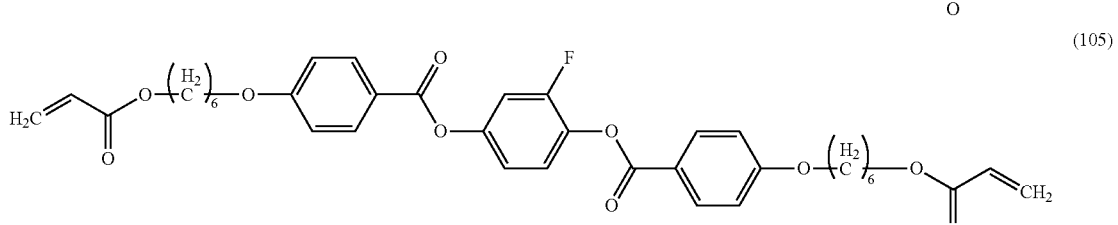
(105)
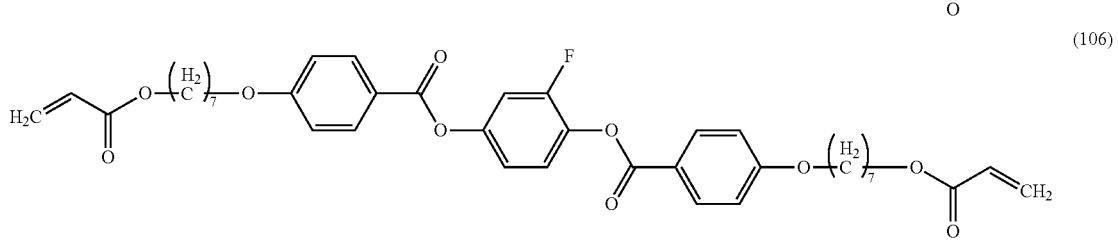
(106)

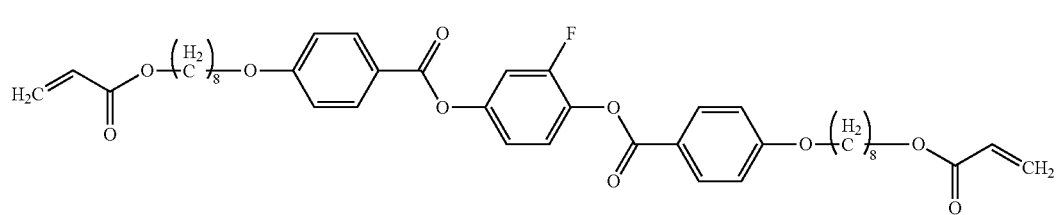
(107)
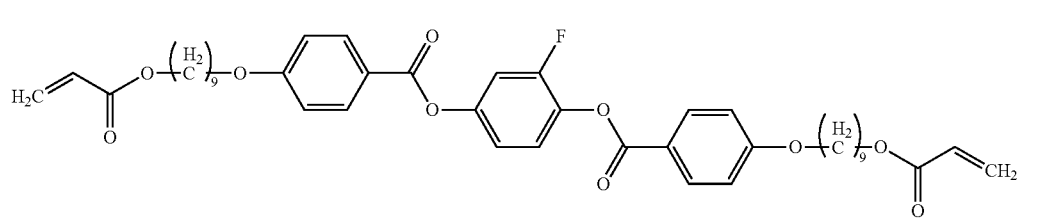
(108)
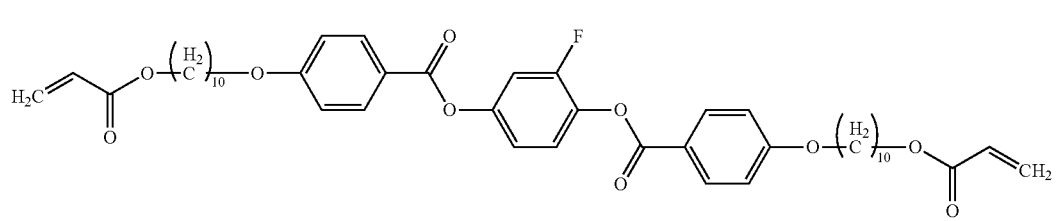
(109)
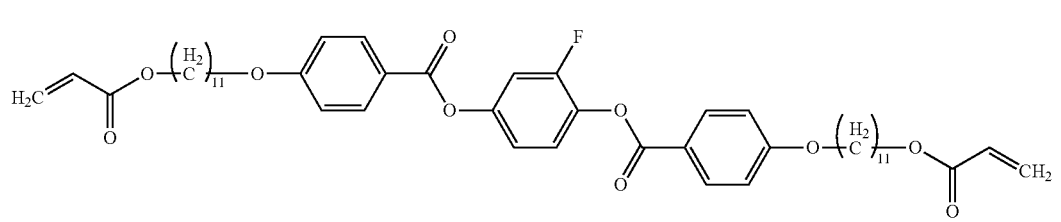
(110)
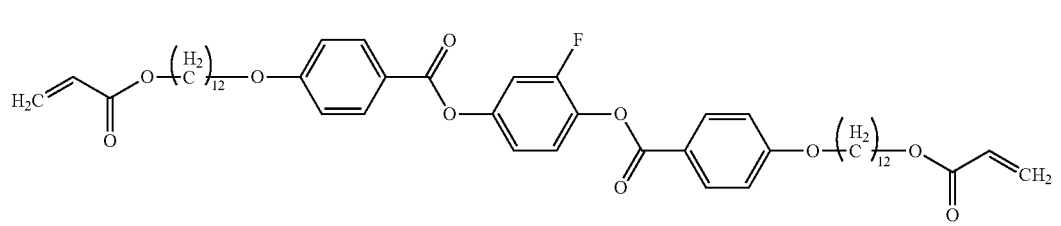
(111)
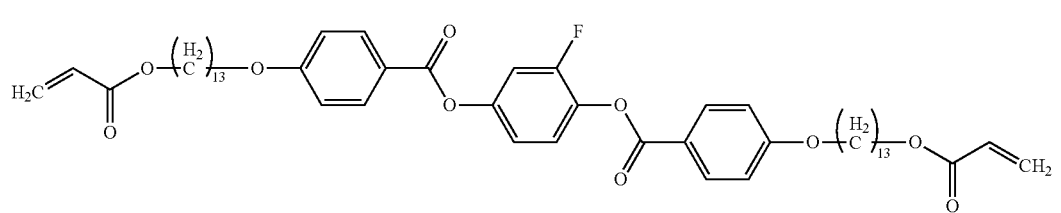
(112)
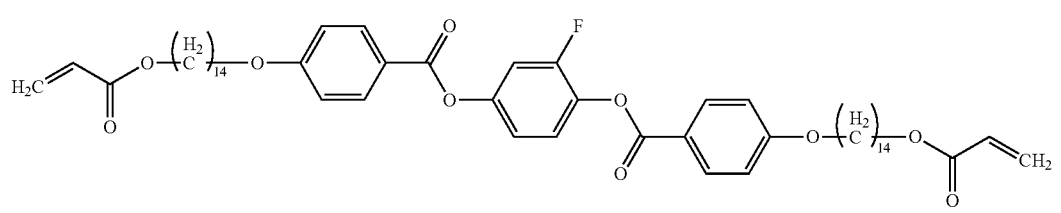
(113)

-continued
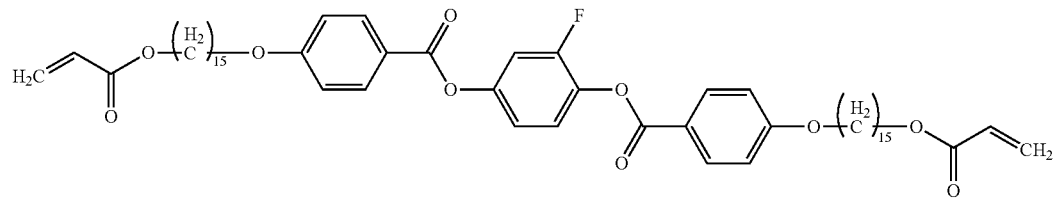
(114)
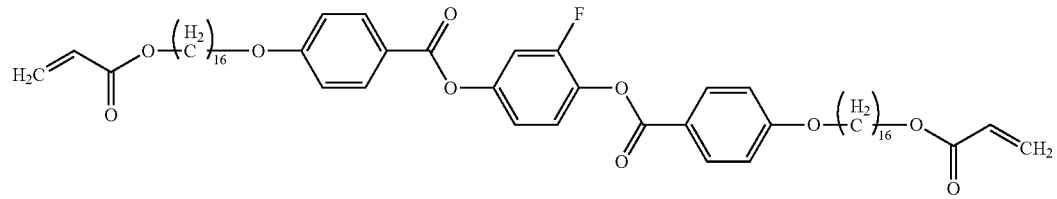
(115)
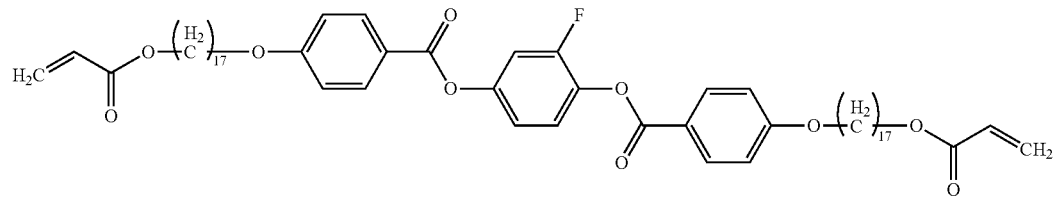
(116)
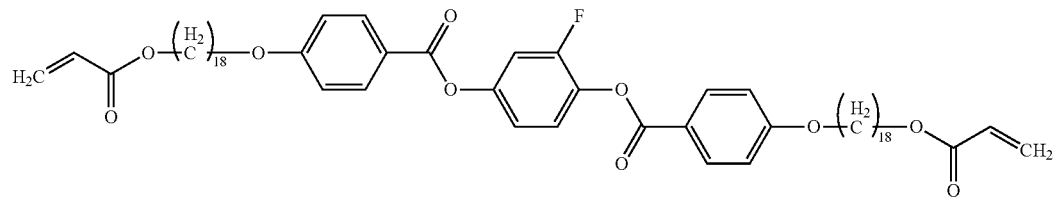
(117)
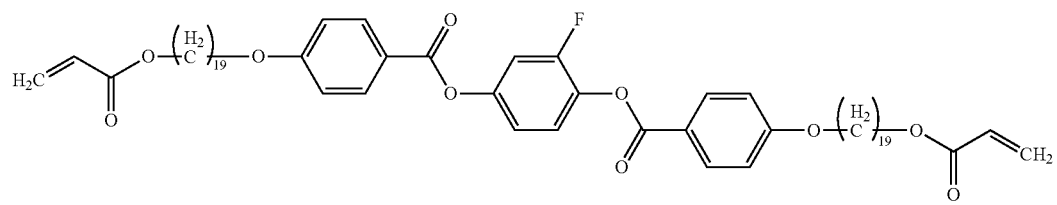
(118)
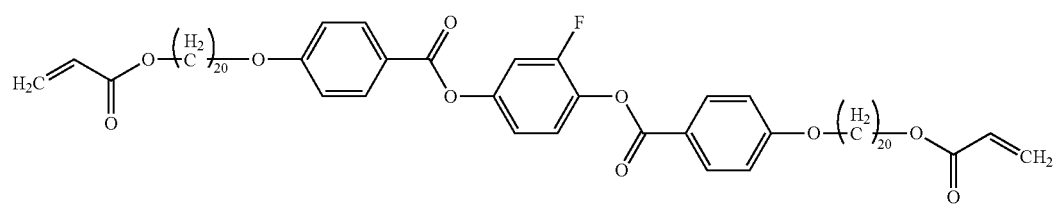
(119)
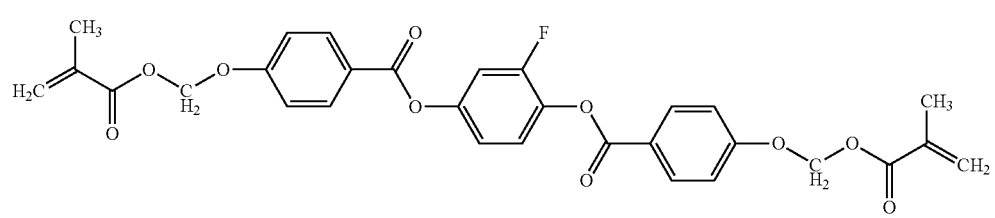
(120)

-continued
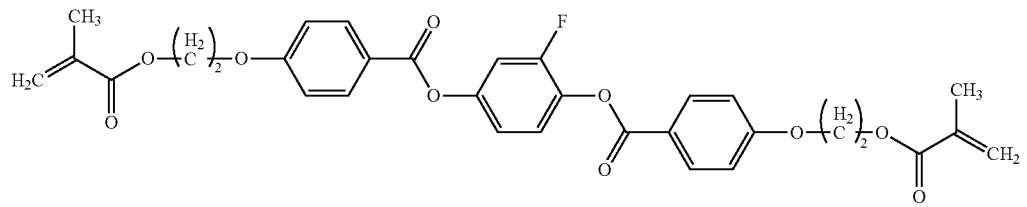
(121)
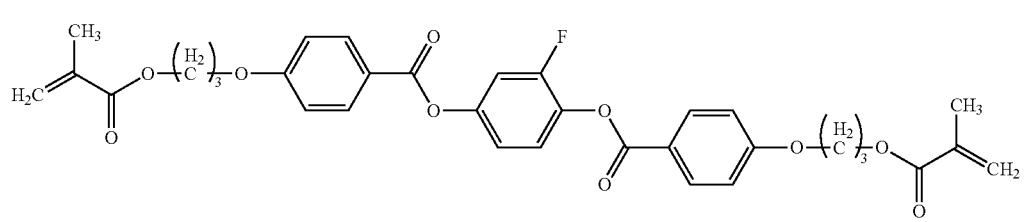
(122)
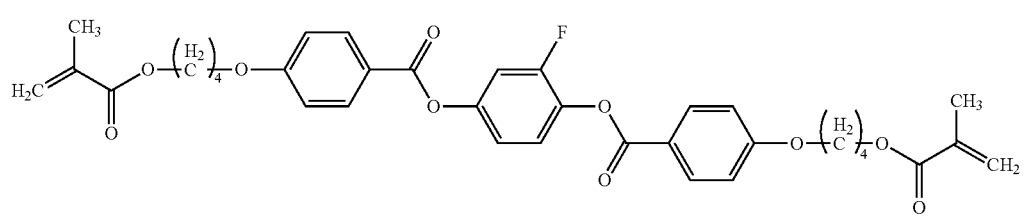
(123)
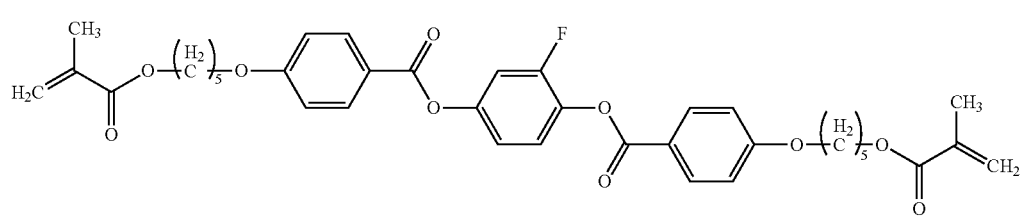
(124)
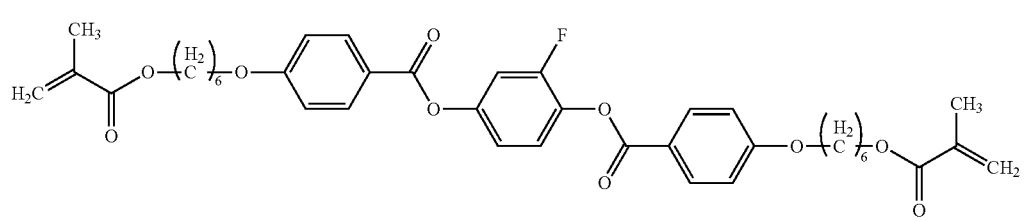
(125)
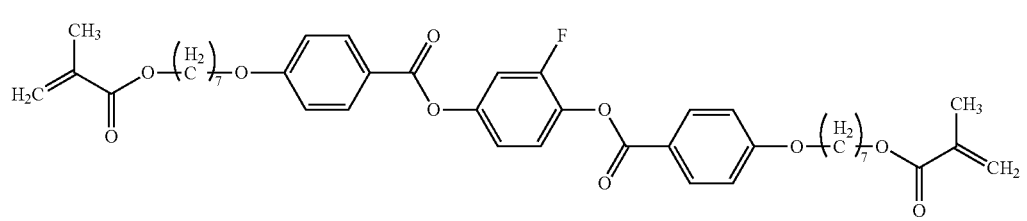
(126)
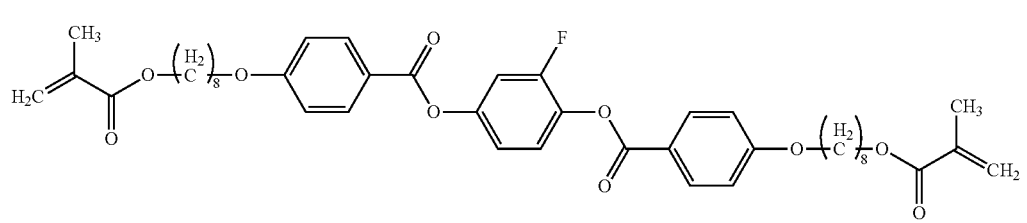
(127)

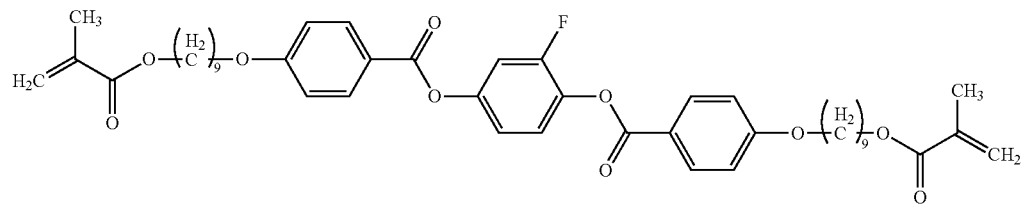
(128)
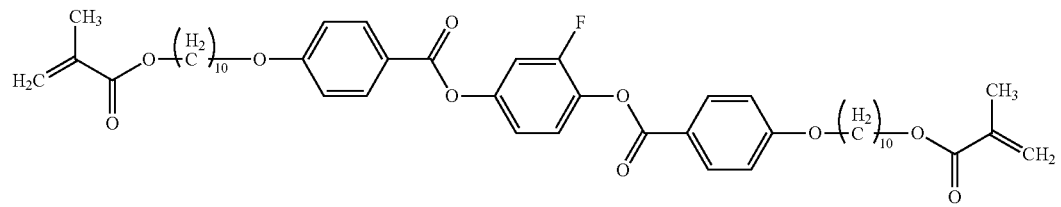
(129)
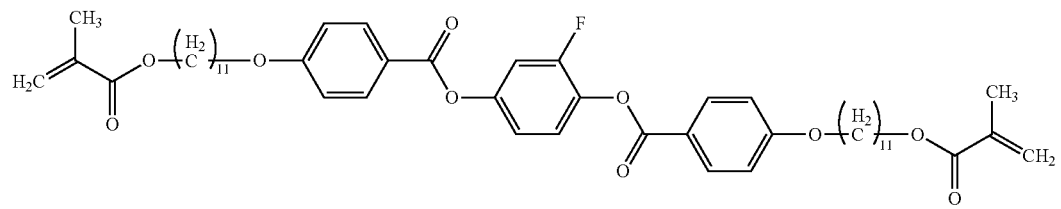
(130)
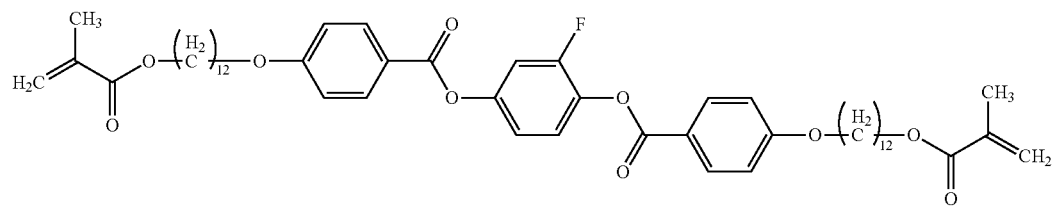
(131)
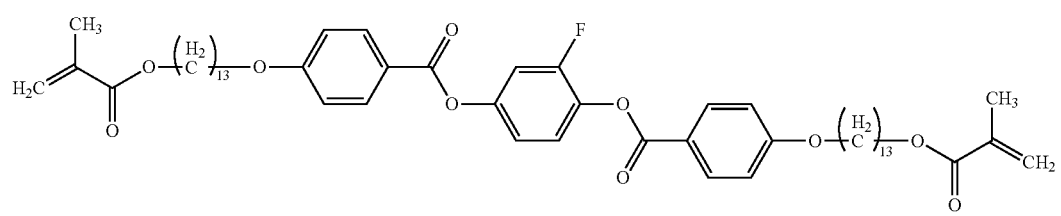
(132)
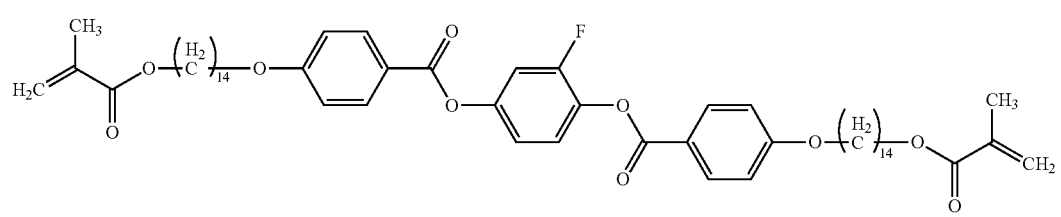
(133)
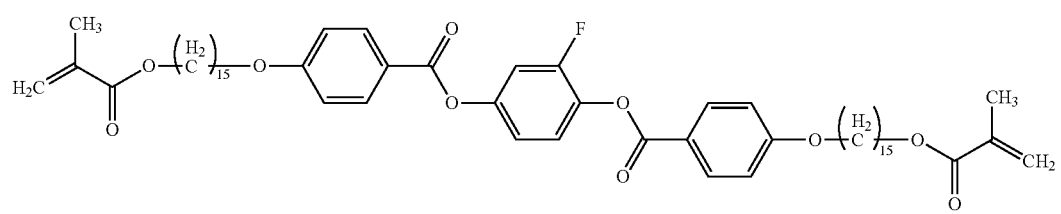
(134)

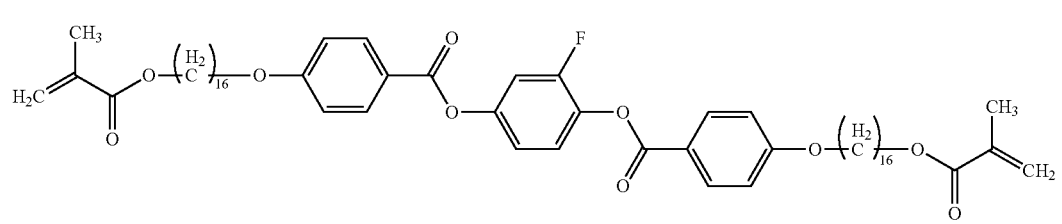
(135)
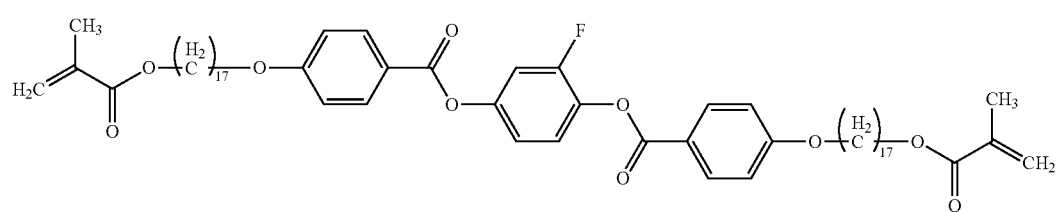
(136)
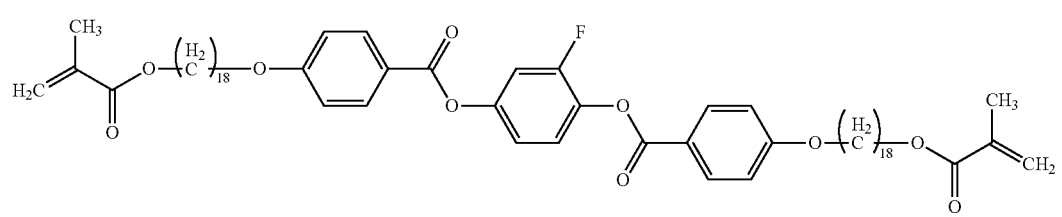
(137)
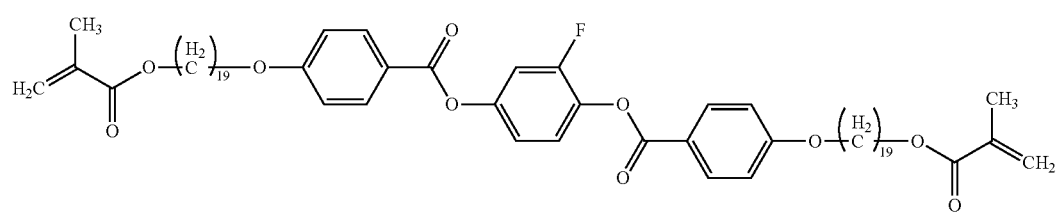
(138)
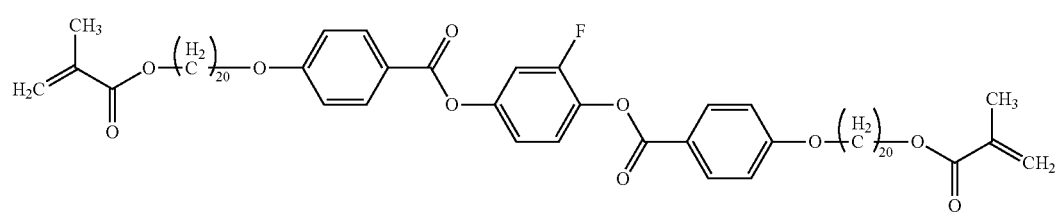
(139)
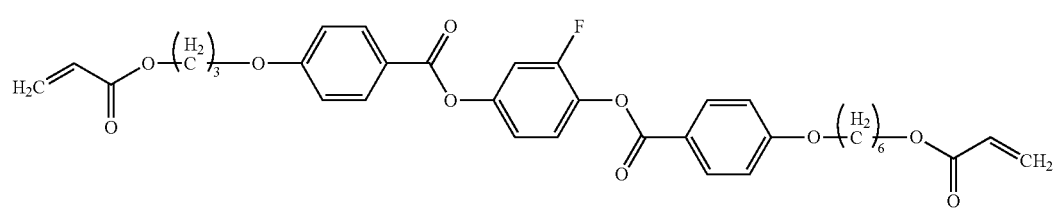
(140)
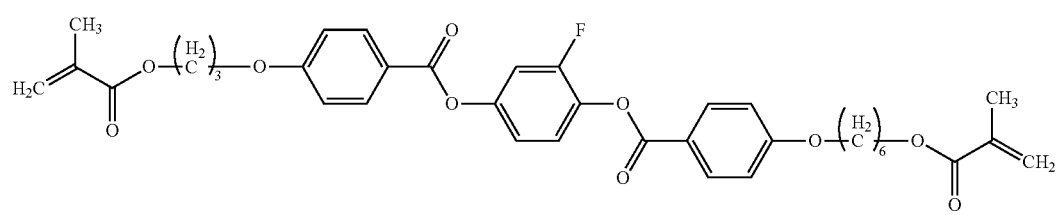
(141)

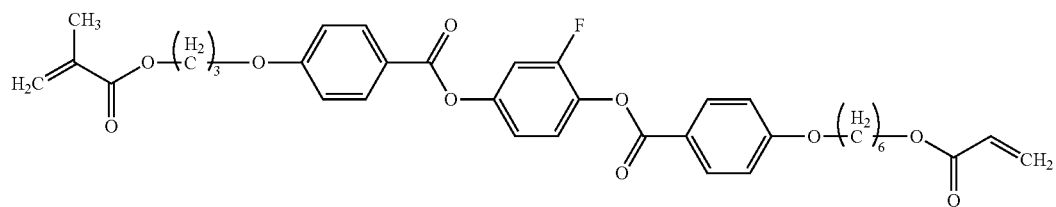

(142)

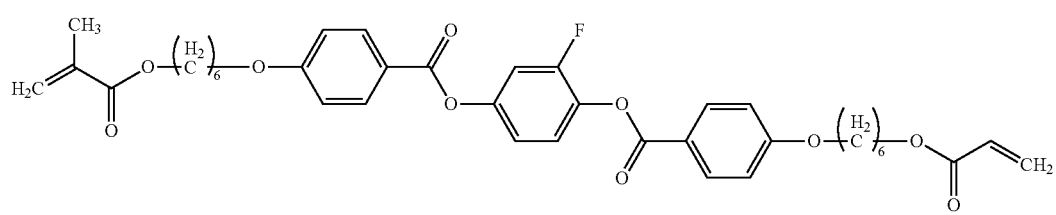

(143)

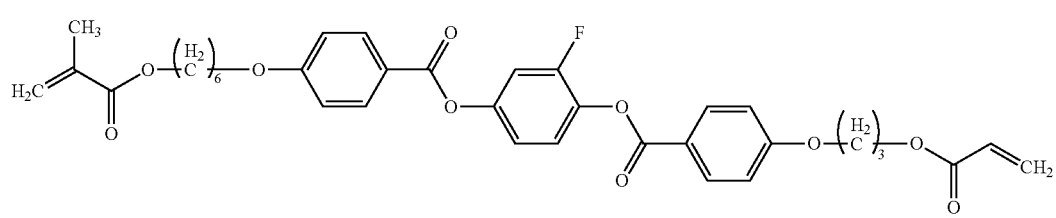

(144)

A variety of reactions can be applied to a synthesis method of the polymerizable monomer which is represented by the general formula (G1) and included in the liquid crystal composition according to an embodiment of the present invention. For example, through synthesis reactions shown in the following synthesis schemes (C-1) and (C-2), or (B-1), the polymerizable monomer which is represented by the general formula (G1) and included in the liquid crystal composition according to an embodiment of the present invention can be synthesized. Note that the synthesis method of the polymerizable monomer represented by the general formula (G1) according to an embodiment of the present invention is not limited to the following synthesis method.

A synthesis method of the polymerizable monomer represented by the following general formula (G1) will be described.

In the general formula (G1), n and m are individually an integer from 1 to 20, and $R^1$ and $R^2$ individually represent hydrogen or a methyl group. First, referring to the following reaction formulae (C-1) and (C-2), a synthesis method of the polymerizable monomer represented by the general formula (G1) will be described.

(C-1)

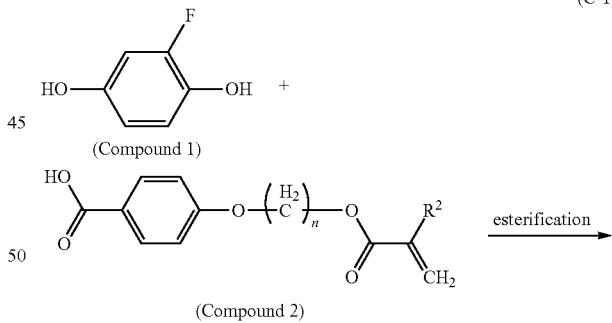

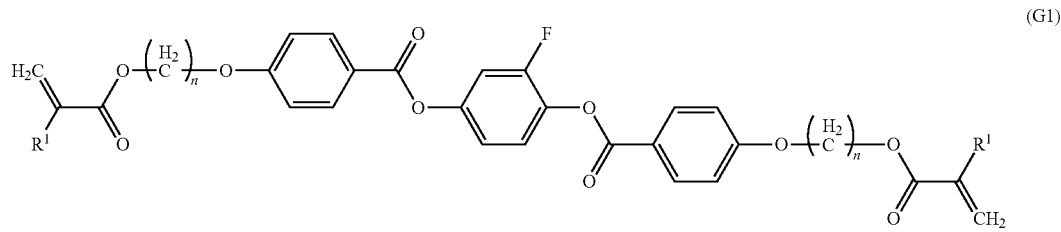

(G1)

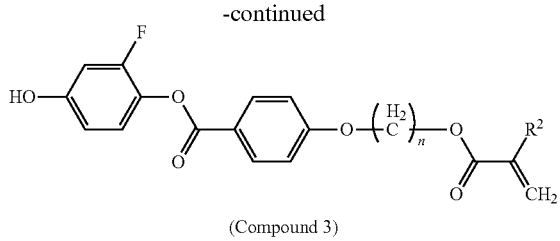

(Compound 3)

An esterification reaction of 2-fluoro-1,4-benzenediol (Compound 1) and a benzoic acid derivative (Compound 2) is performed, whereby a hydroxyphenyl derivative (Compound 3) can be obtained (reaction formula (C-1)). In the reaction formula (C-1), n and m are individually an integer from 1 to 20, and $R^1$ and $R^2$ individually represent hydrogen or a methyl group.

As the esterification reaction, an esterification reaction in which dehydration condensation using an acid catalyst is performed (addition-elimination reaction) is given. In the case where a dehydration condensation reaction is performed, an acid catalyst such as concentrated sulfuric acid or para-toluenesulfonic acid, 1-ethyl-3-(3-dimethylaminopropyl)carbodiimide hydrochroride (abbreviation: EDC), dicyclohexyl carbodiimide (abbreviation: DCC) can be used. In the case where EDC or DCC is used, EDC is preferable because a by-product can be easily removed. The synthesis of Compound 3 is not limited to such reactions.

Next, a synthesis method of the polymerizable compound represented by the general formula (G1) will be described referring to the following reaction formula (C-2).

An esterification reaction of a benzoic acid derivative (Compound 4) and a hydroxyphenyl derivative (Compound 3) can give a target compound represented by the general formula (G1) (reaction formula (C-2)). In the reaction formula (C-2), n and m are individually an integer from 1 to 20, and $R^1$ and $R^2$ individually represent hydrogen or a methyl group.

As the esterification reaction, an esterification reaction in which dehydration condensation using an acid catalyst is performed (addition-elimination reaction) is given. In the case where a dehydration condensation reaction is performed, an acid catalyst such as concentrated sulfuric acid or para-toluenesulfonic acid, 1-ethyl-3-(3-dimethylaminopropyl)carbodiimide hydrochroride (abbreviation: EDC), dicyclohexyl carbodiimide (abbreviation: DCC) can be used. In the case where EDC or DCC is used, EDC is preferable because a by-product can be easily removed. The synthesis of Compound 3 is not limited to such reactions.

Next, a synthesis method of the polymerizable compound represented by the general formula (G1) will be described referring to the following reaction formula (B-1). The target compound represented by the general formula (G1) obtained from the following reaction formula (B-1) shows the case where n=m and $R^1=R^2$ in the general formula (G1) obtained from the reaction formula (C-1) and (C-2).

(C-2)

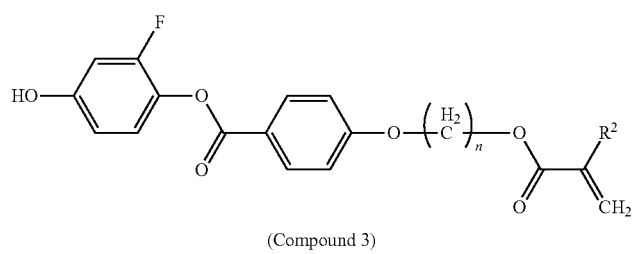

(Compound 3)

+

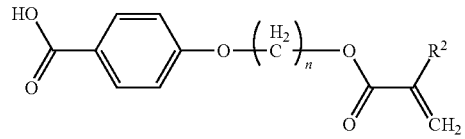

(Compound 4)

esterification →

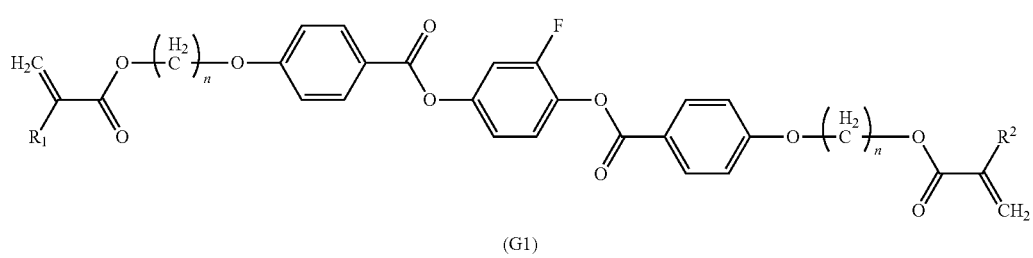

(G1)

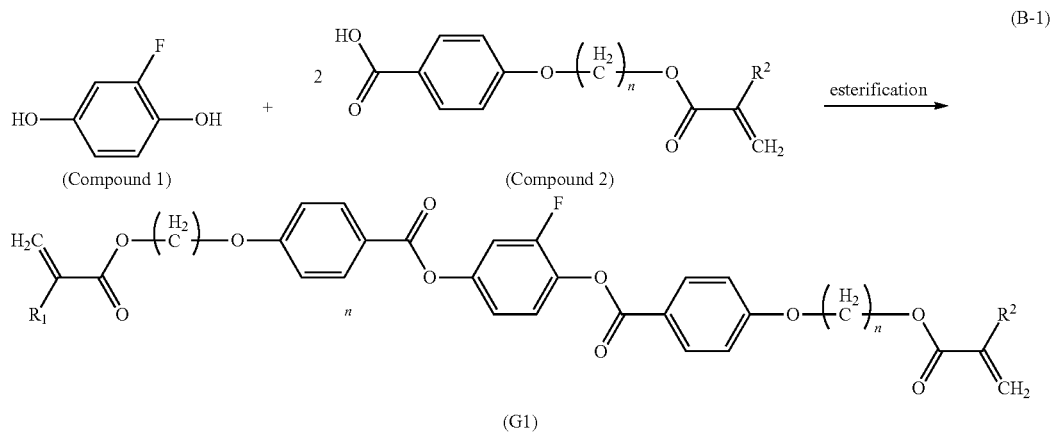

(B-1)

(G1)

An esteritication reaction of one equivalent of 2-fluoro-1,4-benzenediol (Compound 1) and two equivalents of a benzoic acid derivative (Compound 2) can give a target compound represented by the general formula (G1) (reaction formula (B-1)).

In the reaction formula (B-1), n is an integer from 1 to 20, and $R^1$ represents hydrogen or a methyl group.

As the esterification reaction, an esterification reaction in which dehydration condensation using an acid catalyst is performed (addition-elimination reaction) is given. In the case where a dehydration condensation reaction is performed, an acid catalyst such as concentrated sulfuric acid or para-toluenesulfonic acid, 1-ethyl-3-(3-dimethylaminopropyl)carbodiimide hydrochroride (abbreviation: EDC), dicyclohexyl carbodiimide (abbreviation: DCC) can be used. In the case where EDC or DCC is used, EDC is preferable because a by-product can be easily removed. The synthesis of Compound 3 is not limited to such reactions.

In the above manner, the polymerizable monomer represented by the general formula (G1), which is included in the liquid crystal composition according to an embodiment of the present invention, can be synthesized.

The liquid crystal composition according to an embodiment of the present invention, which includes the polymerizable monomer represented by the general formula (G1), a nematic liquid crystal, and a chiral agent, can be used as a liquid crystal composition exhibiting a blue phase.

The nematic liquid crystal is not particularly limited, and examples thereof are a biphenyl-based compound, a terphenyl-based compound, a phenylcyclohexyl-based compound, a biphenylcyclohexyl-based compound, a phenylbicyclohexyl-based compound, a benzoic acid phenyl-based compound, a cyclohexyl benzoic acid phenyl-based compound, a phenyl benzoic acid phenyl-based compound, a bicyclohexyl carboxylic acid phenyl-based compound, an azomethine-based compound, an azo-based compound, an azoxy-based compound, a stilbene-based compound, a bicyclohexyl-based compound, a phenylpyrimidine-based compound, a biphenylpyrimidine-based compound, a pyrimidine-based compound, and a biphenyl ethyne-based compound.

The chiral agent is used to induce twisting of the liquid crystal composition, align the liquid crystal composition in a helical structure, and make the liquid crystal composition exhibit a blue phase. For the chiral agent, a compound which has an asymmetric center, high compatibility with the liquid crystal composition, and strong twisting power is used. In addition, the chiral agent is an optically active substance; a higher optical purity is better and the most preferable optical purity is 99% or higher.

A blue phase is optically isotropic and thus has no viewing angle dependence. Consequently, an alignment film is not necessarily formed; therefore, display image quality can be improved and cost can be reduced.

In a liquid crystal display device including the liquid crystal composition according to an embodiment of the present invention, a polymerizable monomer included in the liquid crystal composition is subjected to polymer stabilization treatment, so that the temperature range where a blue phase is exhibited can be broadened.

In the liquid crystal composition according to an embodiment of the present invention, the polymerizable monomer represented by the general formula (G1) is included as a polymerizable monomer. The use of the liquid crystal composition including the polymerizable monomer represented by the general formula (G1) enables low voltage driving of a liquid crystal element, whereby a reduction in power consumption of a liquid crystal display device, an electronic apparatus, and the like can be achieved. Note that the liquid crystal composition according to an embodiment of the present invention can be used for an optical device which does not have a display function such as an optical shutter.

Further, plural types of polymerizable monomers may be used. In addition to the polymerizable monomer represented by the general formula (G1), other polymerizable monomers can be used.

As the polymerizable monomer, for example, a thermopolymerizable (thermosetting) monomer which can be polymerized by heat, a photopolymerizable (photocurable) monomer which can be polymerized by light, or a polymerizable monomer which can be polymerized by heat and light can be used. Further, a polymerization initiator may be added to the liquid crystal composition.

The polymerizable monomer may be a monofunctional monomer such as acrylate or methacrylate; a polyfunctional monomer such as diacrylate, triacrylate, dimethacrylate, or trimethacrylate; or a mixture thereof. Further, the polymerizable monomer may have liquid crystallinity, non-liquid crystallinity, or both of them.

As the polymerization initiator, a radical polymerization initiator which generates radicals by light irradiation, an acid generator which generates an acid by light irradiation, or a base generator which generates a base by light irradiation may be used. Since the polymerizable monomer represented by the general formula (G1) is a photopolymerizable monomer, a photopolymerization initiator is used.

A photopolymerization initiator is added to the liquid crystal composition including the polymerizable monomer represented by the general formula (G1) which is a photopolymerizable monomer, and irradiation of light having a wavelength at which the polymerizable monomer represented by the general formula (G1) and the photopolymerization initiator react is performed, whereby polymer stabilization treatment can be performed.

This polymer stabilization treatment may be performed on a liquid crystal composition exhibiting an isotropic phase or a liquid crystal composition exhibiting a blue phase under the control of the temperature. A temperature at which the phase changes from a blue phase to an isotropic phase when the temperature rises, or a temperature at which the phase changes from an isotropic phase to a blue phase when the temperature falls is referred to as the phase transition temperature between a blue phase and an isotropic phase. For example, the polymer stabilization treatment can be performed in the following manner: after a liquid crystal composition to which a photopolymerizable monomer is added is heated to exhibit an isotropic phase, the temperature of the liquid crystal composition is gradually lowered so that the phase changes to a blue phase, and then, light irradiation is performed while the temperature at which a blue phase is exhibited is kept.

FIGS. 1A and 1B each illustrate an example of a liquid crystal element and a liquid crystal display device according to an embodiment of the present invention.

A liquid crystal element according to an embodiment of the present invention includes at least, between a pair of electrode layers (a pixel electrode layer 230 and a common electrode layer 232 having different potentials), a liquid crystal composition 208 including the polymerizable monomer represented by the general formula (G1), a nematic liquid crystal, and a chiral agent.

FIGS. 1A and 1B each illustrate a liquid crystal element and a liquid crystal display device in which the liquid crystal composition 208 including the polymerizable monomer represented by the general formula (G1), a nematic liquid crystal, and a chiral agent is provided between a first substrate 200 and a second substrate 201. A difference between the liquid crystal element and the liquid crystal display device in FIG. 1A and those in FIG. 1B is positions of the pixel electrode layer 230 and the common electrode layer 232 with respect to the liquid crystal composition 208.

In the liquid crystal element and the liquid crystal display device illustrated in FIG. 1A, the pixel electrode layer 230 and the common electrode layer 232 are adjacently provided between the first substrate 200 and the liquid crystal composition 208. With the structure in FIG. 1A, a method in which the gray scale is controlled by generating an electric field substantially parallel (i.e., in the lateral direction) to a substrate to move liquid crystal molecules in a plane parallel to the substrate can be used.

The structure in FIG. 1A can be favorably applied to the case where the liquid crystal composition including the polymerizable monomer represented by the general formula (G1), a nematic liquid crystal, and a chiral agent and exhibiting a blue phase, which is a liquid crystal composition according to an embodiment of the present invention, is used as the liquid crystal composition 208. The liquid crystal composition provided as the liquid crystal composition 208 may contain an organic resin.

With an electric field generated between the pixel electrode layer 230 and the common electrode layer 232, liquid crystal is controlled. An electric field in the lateral direction is applied to the liquid crystal, so that liquid crystal molecules can be controlled by the electric field. The liquid crystal composition exhibiting a blue phase is capable of quick response. Thus, a high-performance liquid crystal element and a high-performance liquid crystal display device can be achieved.

For example, such a liquid crystal composition exhibiting a blue phase, which is capable of quick response, can be favorably used for a successive additive color mixing method (field sequential method) in which light-emitting diodes (LEDs) of RGB or the like are arranged in a backlight unit and color display is performed by time division, or a three-dimensional display method using a shutter glasses system in which images for the right eye and images for the left eye are alternately viewed by time division.

In the liquid crystal element and the liquid crystal display device illustrated in FIG. 1B, the pixel electrode layer 230 and the common electrode layer 232 are provided on the first substrate 200 side and the second substrate 201 side respectively, with the liquid crystal composition 208 interposed therebetween. With the structure in FIG. 1B, a method in which the gray scale is controlled by generating an electric field substantially perpendicular to a substrate to move liquid crystal molecules in a plane perpendicular to the substrate can be used. An alignment film 202a may be provided between the liquid crystal composition 208 and the pixel electrode layer 230 and an alignment film 202b may be provided between the liquid crystal composition 208 and the common electrode layer 232. A liquid crystal composition including the polymerizable monomer represented by the general formula (G1), a nematic liquid crystal, and a chiral agent and exhibiting a blue phase, which is a liquid crystal composition according to an embodiment of the present invention, can be used in liquid crystal elements with a variety of structures and liquid crystal display devices with a variety of display modes.

The distance between the pixel electrode layer 230 and the common electrode layer 232, which are adjacent to each other with the liquid crystal composition 208 interposed therebetween, is a distance at which liquid crystal in the liquid crystal composition 208 between the pixel electrode layer 230 and the common electrode layer 232 responds to a predetermined voltage applied to each of the pixel electrode layer 230 and the common electrode layer 232. Alternatively, the voltage applied is controlled depending on the distance as appropriate.

The maximum thickness (film thickness) of the liquid crystal composition 208 is preferably greater than or equal to 1 µm and less than or equal to 20 µm.

The liquid crystal composition 208 can be formed by a dispensing method (dropping method), or an injection method in which liquid crystal is injected using capillary action or the like after the first substrate 200 and the second substrate 201 are attached to each other.

Although not illustrated in FIGS. 1A and 1B, an optical film such as a polarizing plate, a retardation plate, or an anti-reflection film, or the like is provided as appropriate. For example, circular polarization with the polarizing plate and the retardation plate may be used. In addition, a backlight or the like can be used as a light source.

In this specification, a substrate provided with a semiconductor element (e.g., a transistor) or a common electrode layer is referred to as an element substrate (a first substrate), and a substrate which faces the element substrate with a liquid crystal composition interposed therebetween is referred to as a counter substrate (a second substrate).

As a liquid crystal display device according to an embodiment of the present invention, a transmissive liquid crystal display device in which display is performed by transmission of light from a light source, a reflective liquid crystal display device in which display is performed by reflection of incident light, or a transflective liquid crystal display device in which a transmissive type and a reflective type are combined can be provided.

In the case of the transmissive liquid crystal display device, a pixel electrode layer, a common electrode layer, a first substrate, a second substrate, and other components such as an insulating film and a conductive film, which are provided in a pixel region through which light is transmitted, have a property of transmitting light in the visible wavelength range. In the liquid crystal display device having the structure illustrated in FIG. 1A, it is preferable that the pixel electrode layer and the common electrode layer have a light-transmitting property; however, if an opening pattern is provided, a non-light-transmitting material such as a metal film may be used depending on the shape.

On the other hand, in the case of the reflective liquid crystal display device, a reflective component which reflects light transmitted through the liquid crystal composition (e.g., a reflective film or substrate) may be provided on the side opposite to the viewing side of the liquid crystal composition. Therefore, a substrate, an insulating film, and a conductive film which are provided between the viewing side and the reflective component and through which light is transmitted have a light-transmitting property with respect to light in the visible wavelength range. Note that in this specification, a light-transmitting property refers to a property of transmitting at least light in the visible wavelength range. In the liquid crystal display device having the structure illustrated in FIG. 1B, the pixel electrode layer or the common electrode layer on the side opposite to the viewing side may have a light-reflecting property so that it can be used as a reflective component.

The pixel electrode layer 230 and the common electrode layer 232 may be formed with the use of one or more of the following: indium tin oxide, a conductive material in which zinc oxide (ZnO) is mixed into indium oxide, a conductive material in which silicon oxide ($SiO_2$) is mixed into indium oxide, organoindium, organotin, indium oxide containing tungsten oxide, indium zinc oxide containing tungsten oxide, indium oxide containing titanium oxide, and indium tin oxide containing titanium oxide; graphene; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

As the first substrate 200 and the second substrate 201, a glass substrate of barium borosilicate glass, aluminoborosilicate glass, or the like, a quartz substrate, a plastic substrate, or the like can be used. Note that in the case of the reflective liquid crystal display device, a metal substrate such as an aluminum substrate or a stainless steel substrate may be used as a substrate on the side opposite to the viewing side.

In the above manner, a novel liquid crystal composition including the polymerizable monomer represented by the general formula (G1), a nematic liquid crystal, and a chiral agent can be provided.

The use of the liquid crystal composition including the polymerizable monomer represented by the general formula (G1), a nematic liquid crystal, and a chiral agent makes it possible to provide a liquid crystal element and a liquid crystal display device with lower driving voltage. Consequently, a liquid crystal display device with lower power consumption can be provided.

This embodiment can be implemented in appropriate combination with any of the structures described in the other embodiments.

(Embodiment 2)

As a liquid crystal display device according to an embodiment of the present invention, a passive matrix liquid crystal display device and an active matrix liquid crystal display device can be provided. In this embodiment, an example of an active matrix liquid crystal display device according to an embodiment of the present invention will be described with reference to FIGS. 2A and 2B and FIGS. 3A to 3D.

Figure 2A:
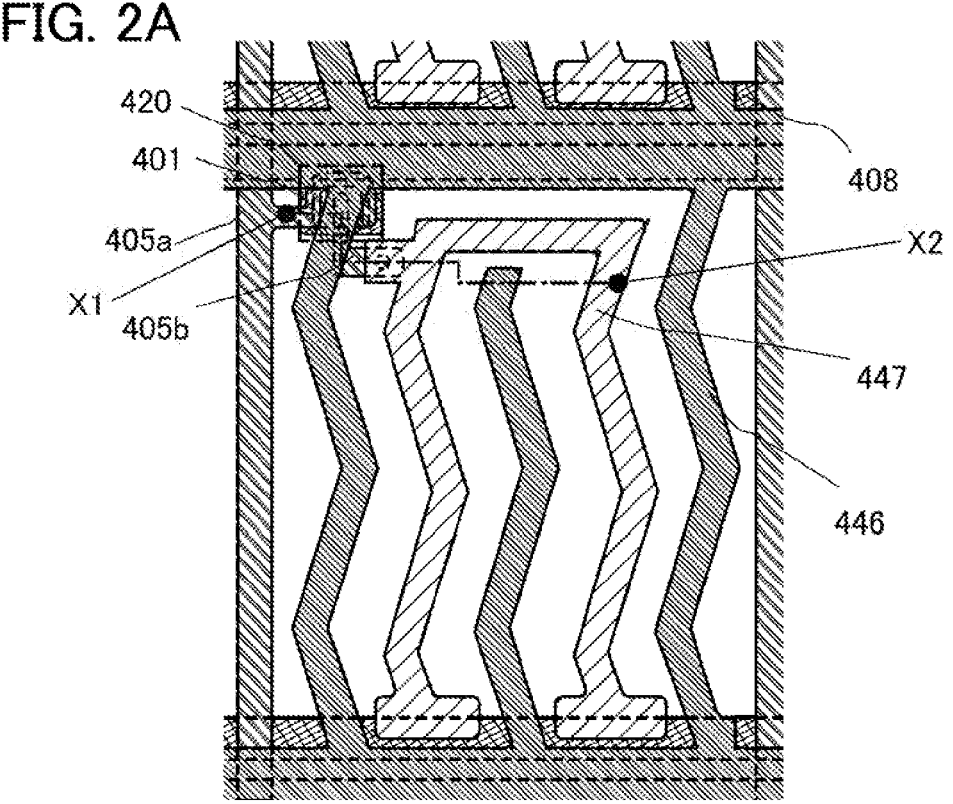
FIGS. 2A and 2B are views illustrating one mode of a liquid crystal display device.
Figure 2B:
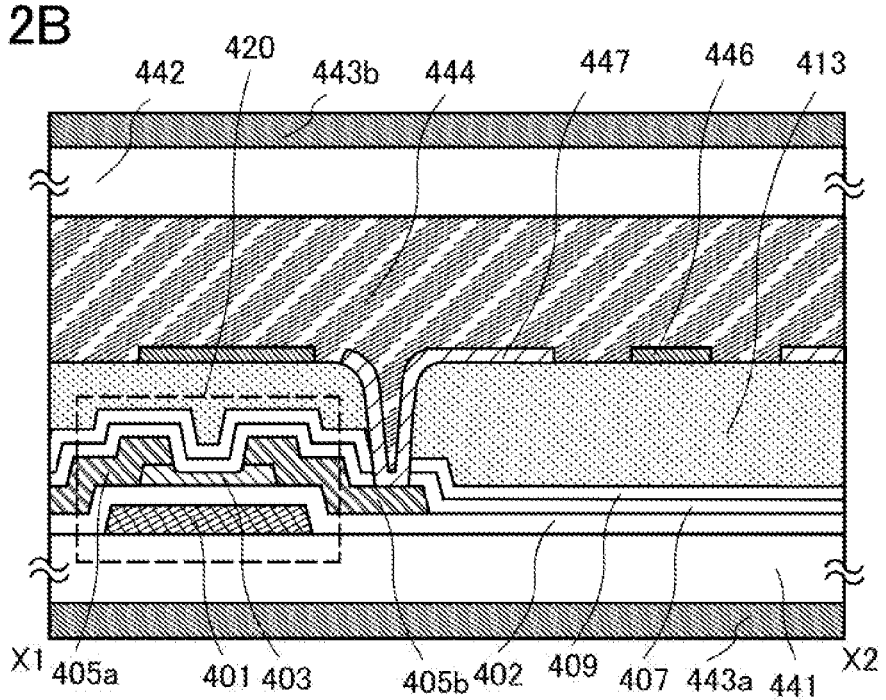

FIG. 2A is a plan view of the liquid crystal display device and illustrates one pixel. FIG. 2B is a cross-sectional view taken along line X1-X2 in FIG. 2A.

In FIG. 2A, a plurality of source wiring layers (including a wiring layer 405a) is arranged so as to be parallel to (extend in the longitudinal direction in the drawing) and apart from each other. A plurality of gate wiring layers (including a gate electrode layer 401) is arranged so as to be extended in the direction perpendicular to or substantially perpendicular to the source wiring layers (in the horizontal direction in the drawing) and apart from each other. Common wiring layers 408 are provided so as to be adjacent to the respective gate wiring layers and extended in the direction parallel to or substantially parallel to the gate wiring layers, that is, in the direction perpendicular to or substantially perpendicular to the source wiring layers (in the horizontal direction in the drawing). A roughly rectangular space is surrounded by the source wiring layers, the common wiring layer 408, and the gate wiring layer. In this space, a pixel electrode layer and a common electrode layer of the liquid crystal display device are provided. A transistor 420 for driving the pixel electrode layer is provided at the upper left corner of the drawing. A plurality of pixel electrode layers and a plurality of transistors are arranged in a matrix.

In the liquid crystal display device in FIGS. 2A and 2B, a first electrode layer 447 electrically connected to the transistor 420 serves as a pixel electrode layer, while a second electrode layer 446 electrically connected to the common wiring layer 408 serves as a common electrode layer. Note that a capacitor is formed by the first electrode layer and the common wiring layer. Although the common electrode layer can operate in a floating state (electrically isolated state), the potential of the common electrode layer may be set to a fixed potential, preferably to a potential around an intermediate potential of an image signal which is transmitted as data at such a level as not to generate flickers.

A method can be used in which the gray scale is controlled by generating an electric field parallel to or substantially parallel to a substrate (i.e., in the lateral direction) to move liquid crystal molecules in a plane parallel to the substrate. For such a method, an electrode structure used in an IPS mode illustrated in FIGS. 2A and 2B and FIGS. 3A to 3D can be employed.

In a lateral electric field mode such as an IPS mode, a first electrode layer (e.g., a pixel electrode layer with which a voltage is controlled in each pixel) and a second electrode layer (e.g., a common electrode layer with which a common voltage is applied to all pixels), each of which has an opening pattern, are located below a liquid crystal composition. Therefore, the first electrode layer 447 and the second electrode layer 446, one of which is a pixel electrode layer and the other of which is a common electrode layer, are formed over a first substrate 441, and at least one of the first electrode layer and the second electrode layer is formed over an insulating film. The first electrode layer 447 and the second electrode layer 446 have not a flat shape but various opening patterns including a bent portion or a branched comb-like portion. The first electrode layer 447 and the second electrode layer 446 have the same shape and do not overlap with each other in order to generate an electric field between the electrodes.

The first electrode layer 447 and the second electrode layer 446 may have an electrode structure used in an FFS mode. In a lateral electric field mode such as an FFS mode, a first electrode layer (e.g., a pixel electrode layer with which a voltage is controlled in each pixel) having an opening pattern is located below a liquid crystal composition, and further, a second electrode layer (e.g., a common electrode layer with which a common voltage is applied to all pixels) having a flat shape is located below the opening pattern. In this case, the first electrode layer and the second electrode layer, one of which is a pixel electrode layer and the other of which is a common electrode layer, are formed over the first substrate 441, and the pixel electrode layer and the common electrode layer are stacked with an insulating film (or an interlayer insulating film) interposed therebetween. One of the pixel electrode layer and the common electrode layer is formed below the insulating film (or the interlayer insulating film), whereas the other is formed above the insulating film (or the interlayer insulating film) and has various opening patterns including a bent portion or a branched comb-like portion. The first electrode layer 447 and the second electrode layer 446 have the same shape and do not overlap with each other in order to generate an electric field between the electrodes.

The liquid crystal composition including the polymerizable monomer represented by the general formula (G1), a nematic liquid crystal, and a chiral agent, which is described in Embodiment 1, is used as a liquid crystal composition 444. The liquid crystal composition 444 may further contain an organic resin. In this embodiment, the liquid crystal composition 444, which exhibits a blue phase, is provided in a liquid crystal display device with a blue phase exhibited (with a blue phase shown) by being subjected to polymer stabilization treatment.

With an electric field generated between the first electrode layer 447 as the pixel electrode layer and the second electrode layer 446 as the common electrode layer, liquid crystal of the liquid crystal composition 444 is controlled. An electric field in the lateral direction is formed in the liquid crystal, so that liquid crystal molecules can be controlled using the electric field. Since the liquid crystal molecules aligned to exhibit a blue phase can be controlled in the direction parallel to the substrate, a wide viewing angle is obtained.

Figure 3A:
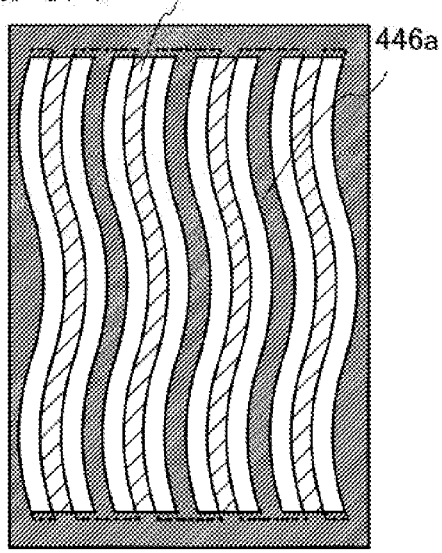
FIGS. 3A to 3D are each a view illustrating one mode of an electrode structure of a liquid crystal display device.
Figure 3B:
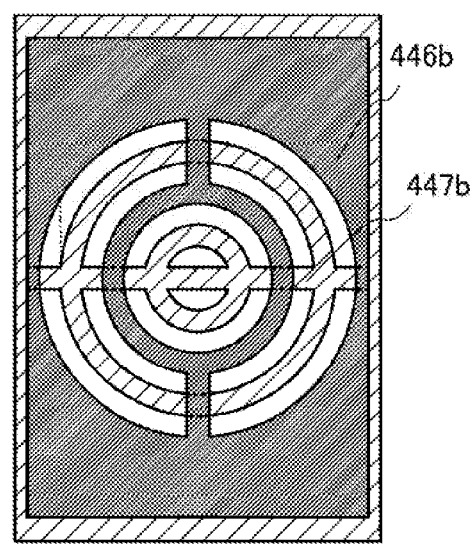
Figure 3C:
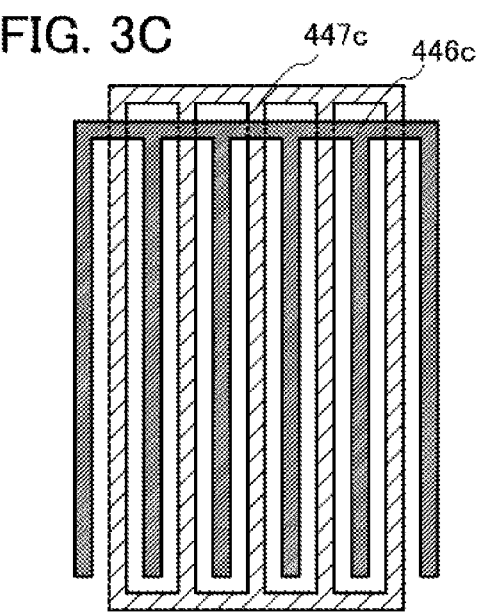
Figure 3D:
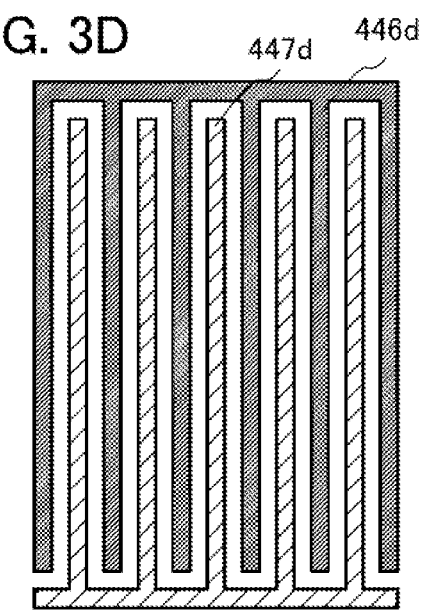

FIGS. 3A to 3D illustrate other examples of the first electrode layer 447 and the second electrode layer 446. As illustrated in top views of FIGS. 3A to 3D, first electrode layers 447a to 447d and second electrode layers 446a to 446d are arranged alternately. In FIG. 3A, the first electrode layer 447a and the second electrode layer 446a have wavelike shapes with curves. In FIG. 3B, the first electrode layer 447b and the second electrode layer 446h have shapes with concentric circular openings. In FIG. 3C, the first electrode layer 447c and the second electrode layer 446c have comb-like shapes and partially overlap with each other. In FIG. 3D, the first electrode layer 447d and the second electrode layer 446d have comb-like shapes in which the electrode layers are engaged with each other. In the case where the first electrode layers 447a, 447b, and 447c overlap with the second electrode layers 446a, 446b, and 446c, respectively, as illustrated in FIGS. 3A to 3C, an insulating film is formed between the first electrode layer 447 and the second electrode layer 446 so that the first electrode layer 447 and the second electrode layer 446 are formed over different films.

Since the first electrode layer 447 and the second electrode layer 446 have opening patterns, they are illustrated as divided plural electrode layers in the cross-sectional view in FIG. 2B. The same applies to the other drawings of this specification.

The transistor 420 is an inverted staggered thin film transistor in which the gate electrode layer 401, a gate insulating layer 402, a semiconductor layer 403, and wiring layers 405a and 405b which function as a source electrode layer and a drain electrode layer are formed over the first substrate 441 having an insulating surface.

There is no particular limitation on the structure of a transistor which can be used for a liquid crystal display device disclosed in this specification. For example, a staggered type or a planar type having a top-gate structure or a bottom-gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel region with a gate insulating layer interposed therebetween.

An insulating film 407 which is in contact with the semiconductor layer 403, and an insulating film 409 are provided to cover the transistor 420. An interlayer film 413 is stacked over the insulating film 409.

There is no particular limitation on the method for forming the interlayer film 413, and the following method can be employed depending on the material: spin coating, dip coating, spray coating, a droplet discharging method (such as an ink-jet method), a printing method (such as screen printing or offset printing), roll coating, curtain coating, knife coating, or the like.

The first substrate 441 and a second substrate 442 which is a counter substrate are firmly attached to each other with a sealant with the liquid crystal composition 444 interposed therebetween. The liquid crystal composition 444 can be formed by a dispensing method (a dropping method), or an injection method in which liquid crystal is injected using capillary action or the like after the first substrate 441 is attached to the second substrate 442.

As the sealant, typically, a visible light curable resin, a UV curable resin, or a thermosetting resin is preferably used. Typically, an acrylic resin, an epoxy resin, an amine resin, or the like can be used. Further, a photopolymerization initiator (typically, a UV polymerization initiator), a thermosetting agent, a filler, or a coupling agent may be contained in the sealant.

Since a liquid crystal composition including a photopolymerization initiator, the polymerizable monomer represented by the general formula (G1), a nematic liquid crystal, and a chiral agent are used for the liquid crystal composition 444, polymer stabilization treatment can be performed by light irradiation.

After the space between the first substrate 441 and the second substrate 442 is filled with the liquid crystal composition including a photopolymerization initiator, the polymerizable monomer represented by the general formula (G1), a nematic liquid crystal, and a chiral agent, polymer stabilization treatment is performed by light irradiation, whereby the liquid crystal composition 444 is formed. The light has a wavelength at which the polymerizable monomer represented by the general formula (G1) and the photopolymerization initiator which are used for the liquid crystal composition 444 react. By such polymer stabilization treatment by light irradiation, the temperature range where the liquid crystal composition 444 exhibits a blue phase can be broadened.

In the case where a photocurable resin such as a UV curable resin is used as a sealant and a liquid crystal composition is formed by a dropping method, for example, the sealant may be cured in the light irradiation step of the polymer stabilization treatment.

In this embodiment, a polarizing plate 443a is provided on the outer side (on the side opposite to the liquid crystal composition 444) of the first substrate 441, and a polarizing plate 443h is provided on the outer side (on the side opposite to the liquid crystal composition 444) of the second substrate 442. In addition to the polarizing plate, an optical film such as a retardation plate or an anti-reflection film may be provided. For example, circular polarization with the polarizing plate and the retardation plate may be used. Through the above process, a liquid crystal display device can be completed.

In the case of manufacturing a plurality of liquid crystal display devices using a large-sized substrate (a so-called multiple panel method), a division step can be performed before performing the polymer stabilization treatment or before providing the polarizing plates. In consideration of the influence of the division step on the liquid crystal composition (such as alignment disorder due to force applied in the division step), it is preferable that the division step be performed after attaching the first substrate and the second substrate and before performing the polymer stabilization treatment.

Although not illustrated, a backlight, a sidelight, or the like may be used as a light source. Light from the light source is emitted from the side of the first substrate 441 which is an element substrate so as to pass through the second substrate 442 on the viewing side.

The first electrode layer 447 and the second electrode layer 446 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

The first electrode layer 447 and the second electrode layer 446 can be formed of one or more materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

The first electrode layer 447 and the second electrode layer 446 can be formed using a conductive composition including a conductive macromolecule (also referred to as a conductive polymer).

As the conductive high molecule, a so-called π-electron conjugated conductive polymer can be used. Examples thereof include polyaniline or a derivative thereof, polypyrrole or a derivative thereof, polythiophene or a derivative thereof, a copolymer of two or more kinds of aniline, pyrrole, and thiophene or a derivative thereof.

An insulating film serving as a base film may be provided between the first substrate 441 and the gate electrode layer 401. The base film has a function of preventing diffusion of an impurity element from the first substrate 441, and can be formed to have a single-layer structure or a layered structure using one or more of a silicon nitride film, a silicon oxide film, a silicon nitride oxide film, and a silicon oxynitride film. The gate electrode layer 401 can be formed to have a single-layer structure or a layered structure using any of metal materials such as molybdenum, titanium, chromium, tantalum, tungsten, aluminum, copper, neodymium, and scandium, and an alloy material which contains any of these materials as its main component. Alternatively, a semiconductor film typified by a polycrystalline silicon film doped with an impurity element such as phosphorus, or a silicide film such as a nickel silicide film may be used as the gate electrode layer 401. By using a light-blocking conductive film as the gate electrode layer 401, light from a backlight (light emitted through the first substrate 441) can be prevented from entering the semiconductor layer 403.

For example, as a two-layer structure of the gate electrode layer 401, the following structures are preferable: a two-layer structure of an aluminum layer and a molybdenum layer stacked thereover, a two-layer structure of a copper layer and a molybdenum layer stacked thereover, a two-layer structure of a copper layer and a titanium nitride layer or a tantalum nitride layer stacked thereover, and a two-layer structure of a titanium nitride layer and a molybdenum layer. As a three-layer structure, a layered structure in which a tungsten layer or a tungsten nitride layer, an alloy layer of aluminum and silicon or an alloy layer of aluminum and titanium, and a titanium nitride layer or a titanium layer are stacked is preferable.

For example, the gate insulating layer 402 can be formed by a plasma CVD method or a sputtering method, with the use of a silicon oxide film, a gallium oxide film, an aluminum oxide film, a silicon nitride film, a silicon oxynitride film, an aluminum oxynitride film, or a silicon nitride oxide film. Alternatively, a high-k material such as hafnium oxide, yttrium oxide, lanthanum oxide, hafnium silicate ($HfSi_xO_y$, ($x>0$, $y>0$)), hafnium aluminate ($HfAl_xO_y$, ($x>0$, $y>0$)), hafnium silicate to which nitrogen is added, or hafnium aluminate to which nitrogen is added may be used as a material for the gate insulating layer 402. The use of such a high-k material enables a reduction in gate leakage current.

Alternatively, the gate insulating layer 402 can be formed using a silicon oxide layer by a CVD method using an organosilane gas. As an organosilane gas, a silicon-containing compound such as tetraethoxysilane (TES) (chemical formula: $Si(OC_2H_5)_4$), tetramethylsilane (chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), or trisdimethylaminosilane ($SiH(N(CH_3)_2)_3$) can be used. Note that the gate insulating layer 402 may have a s single layer structure or a stacked structure.

A material of the semiconductor layer 403 is not particularly limited and may be determined as appropriate depending on characteristics needed for the transistor 420. Examples of a material which can be used for the semiconductor layer 403 will be described.

The semiconductor layer 403 can be formed using the following material: an amorphous semiconductor formed by a chemical vapor deposition method using a semiconductor source gas typified by silane or germane or by a physical vapor deposition method such as sputtering; a polycrystalline semiconductor formed by crystallizing the amorphous semiconductor with the use of light energy or thermal energy; a microcrystalline semiconductor in which a minute crystalline phase and an amorphous phase coexist; or the like. The semiconductor layer can be formed by a sputtering method, an LPCVD method, a plasma CVD method, or the like.

A typical example of an amorphous semiconductor is hydrogenated amorphous silicon, while a typical example of a crystalline semiconductor is polysilicon. Examples of polysilicon (polycrystalline silicon) are as follows: so-called high-temperature polysilicon which contains polysilicon formed at a process temperature of 800° C. or higher as its main component, so-called low-temperature polysilicon which contains polysilicon formed at a process temperature of 600° C. or lower as its main component, and polysilicon obtained by crystallizing amorphous silicon with the use of an element that promotes crystallization, or the like. It is needless to say that a microcrystalline semiconductor or a semiconductor partly containing a crystal phase can be used as described above.

Alternatively, the semiconductor layer 403 may be formed with the use of an oxide semiconductor. For example, a metal oxide material containing two or more elements selected from In, Ga, Zn, and Sn may be used as the oxide semiconductor. As another example, a four-component metal oxide such as an In—Sn—Ga—Zn—O-hased material; a three-component metal oxide such as an In—Ga—Zn—O-based material, an In—Sn—Zn—O-based material, an In—Al—Zn—O-based material, a Sn—Ga—Zn—O-based material, an Al—Ga—Zn—O-based material, a Sn—Al—Zn—O-based material, or a Hf—In—Zn—O-based material; a two-component metal oxide such as an In—Zn—O-based material, a Sn—Zn—O-based material, an Al—Zn—O-based material, a Zn—Mg—O-based material, a Sn—Mg—O-based material, an In—Mg—O-based material, or an In—Ga—O-based material; or a single-component metal oxide such as an In—O-based material, a Sn—O-based material, or a Zn—O-based material may be used. In addition, any of the above oxide semiconductors may contain an element other than In, Ga, Sn, and Zn, for example, $SiO_2$.

Here, for example, the In—Ga—Zn-based oxide semiconductor refers to an oxide semiconductor containing indium (In), gallium (Ga), and zinc (Zn) and there is no particular limitation on the composition ratio thereof.

For the oxide semiconductor layer, a thin film expressed by the chemical formula, $InMO_3(ZnO)_m$ (m>0), can be used. Here, M represents one or more metal elements selected from Ga, Al, Mn, and Co. For example, in can be Ga, Ga and Al, Ga and Mn, or Ga and Co.

In the case where the In—Sn—Zn—O-based material is used as oxide semiconductor, a target may have a composition ratio of In: Sn: Zn=1:2:2, In: Sn: Zn=2:1:3, In: Sn: Zn=1:1:1.

In the case where an In—Zn—O-based material is used as the oxide semiconductor, the atomic ratio is set so that In/Zn is in a range from 0.5 to 50, preferably, from 1 to 20, more preferably from 1.5 to 15. When the atomic ratio of Zn is in the above-described range, a transistor can be improved in field-effect mobility. Here, when the atomic ratio of the compound is In:Zn:O=X:Y:Z, the relation Z>1.5X+Y is satisfied.

For the oxide semiconductor layer, a crystalline oxide semiconductor which is neither a single crystal nor an amorphous and has c-axis orientation (also referred to as c-axis aligned crystalline oxide semiconductor (CAAC-OS)).

In a process of forming the semiconductor layer and the wiring layer, an etching step is used to process thin films into desired shapes. Dry etching or wet etching can be employed for the etching step.

The etching conditions (such as an etchant, etching time, and temperature) are appropriately adjusted depending on the material so that the material can be etched to have a desired shape.

As a material of the wiring layers 405a and 405b serving as source and drain electrode layers, an element selected from Al, Cr, Ta, Ti, Mo, and W; an alloy containing any of the above elements as its component; an alloy film containing a combination of any of these elements; and the like can be given. Further, in the case where heat treatment is performed, the conductive film preferably has heat resistance against the heat treatment. Since the use of aluminum alone brings disadvantages such as low heat resistance and a tendency to corrosion, aluminum is used in combination with a conductive material having heat resistance. As the conductive material having heat resistance, which is combined with aluminum, it is possible to use an element selected from titanium (Ti), tantalum (Ta), tungsten (W), molybdenum (Mo), chromium (Cr), neodymium (Nd), and scandium (Sc); an alloy containing any of these elements as its component; an alloy containing a combination of any of these elements; or a nitride containing any of these elements as its component.

The gate insulating layer 402, the semiconductor layer 403, and the wiring layers 405a and 405b serving as source and drain electrode layers may be successively formed without being exposed to the air. Successive film formation without exposure to the air makes it possible to obtain each interface between stacked layers, which is not contaminated by atmospheric components or impurity elements in the air. Therefore, variation in characteristics of the transistor can be reduced.

Note that the semiconductor layer 403 is partly etched so as to have a groove (a depressed portion).

As the insulating film 407 and the insulating film 409 which cover the transistor 420, an inorganic insulating film or an organic insulating film formed by a dry method or a wet method can be used. For example, it is possible to use a silicon nitride film, a silicon oxide film, a silicon oxynitride film, an aluminum oxide film, or a tantalum oxide film, which is formed by a CVD method, a sputtering method, or the like. Alternatively, an organic material such as polyimide, acrylic, a benzocyclobutene-based resin, polyamide, or epoxy can be used. As an alternative to such organic materials, it is possible to use a low-dielectric constant material (a low-k material), a siloxane-based resin, phosphosilicate glass (PSG), borophosphosilicate glass (BPSG), or the like. A gallium oxide film can also be used as the insulating film 407.

Note that the siloxane-based resin corresponds to a resin including a Si—O—Si bond formed using a siloxane-based material as a starting material. The siloxane-based resin may include as a substituent an organic group (e.g., an alkyl group or an aryl group) or a fluoro group. The organic group may include a fluoro group. A siloxane-based resin is applied by a coating method and baked; thus, the insulating film 407 can be formed.

Alternatively, the insulating film 407 and the insulating film 409 may be formed by stacking a plurality of insulating films formed using any of these materials. For example, a structure may be employed in which an organic resin film is stacked over an inorganic insulating film.

Further, with the use of a resist mask having regions with plural thicknesses (typically, two different thicknesses) which is formed using a multi-tone mask, the number of photomasks can be reduced, resulting in a simplified process and lower cost.

As described above, the use of the liquid crystal composition including the polymerizable monomer represented by the general formula (G1), a nematic liquid crystal, and a chiral agent makes it possible to provide a liquid crystal element and a liquid crystal display device with lower driving voltage. Consequently, a liquid crystal display device with lower power consumption can be provided.

Since the liquid crystal composition including the polymerizable monomer represented by the general formula (G1), a nematic liquid crystal, and a chiral agent and exhibiting a blue phase is capable of quick response, a high-performance liquid crystal display device can be achieved.

This embodiment can be implemented in appropriate combination with any of the structures described in the other embodiments.

(Embodiment 3)

A liquid crystal display device having a display function can be manufactured by manufacturing transistors and using the transistors for a pixel portion and further for a driver circuit. Further, part or the whole of the driver circuit can be formed over the same substrate as the pixel portion, using the transistor, whereby a system-on-panel can be obtained.

The liquid crystal display device includes a liquid crystal element (also referred to as a liquid crystal display element) as a display element.

Further, a liquid crystal display device includes a panel in which a liquid crystal display element is sealed, and a module in which an IC or the like including a controller is mounted to the panel. An embodiment of the present invention also relates to an element substrate, which corresponds to one mode in which the display element has not been completed in a manufacturing process of the liquid crystal display device, and the element substrate is provided with a means for supplying current to the display element in each of a plurality of pixels. Specifically, the element substrate may be in a state where it is provided only with a pixel electrode of the display element, in a state where a conductive film to be a pixel electrode has been formed and the conductive film has not yet been etched to form the pixel electrode, or in any other state.

Note that a liquid crystal display device in this specification means an image display device, a display device, or a light source (including a lighting device). Further, the liquid crystal display device includes any of the following modules in its category: a module to which a connector such as a flexible printed circuit (FPC), tape automated bonding (TAR) tape, or a tape carrier package (TCP) is attached; a module having TAR tape or a TCP which is provided with a printed wiring board at the end thereof; and a module having an integrated circuit (IC) directly mounted on a display element by a chip on glass (COG) method.

Figure 4B:
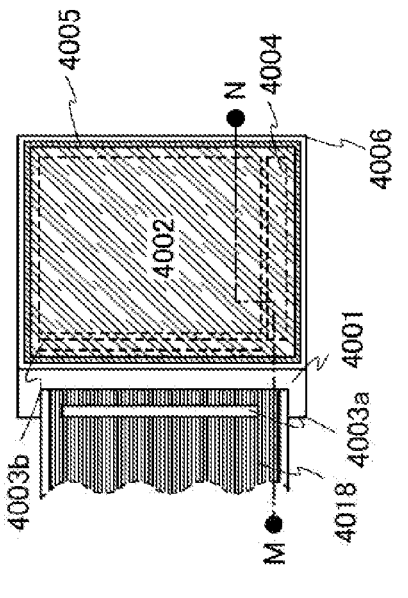
Figure 4B:
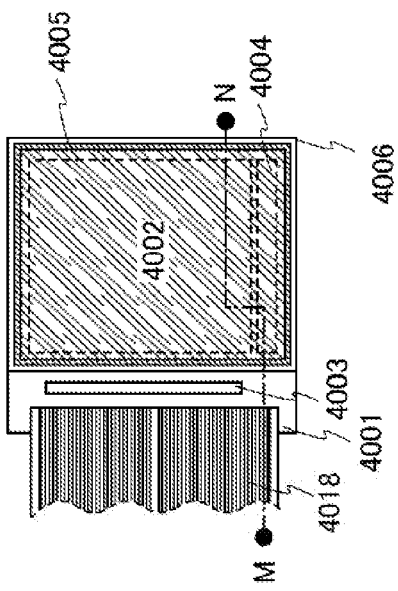
Figure 4B:
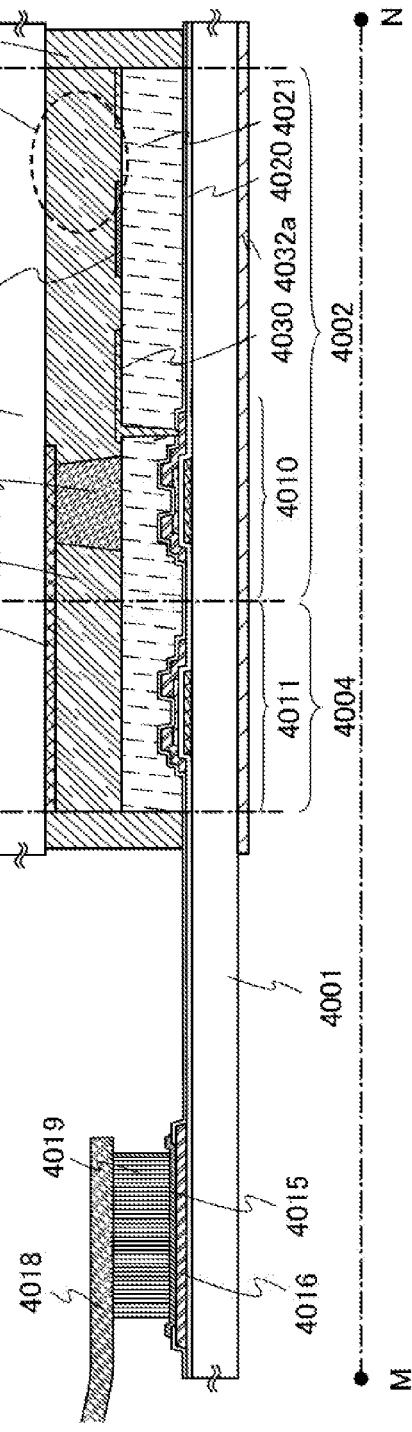

The appearance and a cross section of a liquid crystal display panel, which is an embodiment of a liquid crystal display device, will be described with reference to FIGS. 4A1, 4A2, and 4B. FIGS. 4A1 and 4A2 are each a top view of a panel in which transistors 4010 and 4011 formed over a first substrate 4001 and a liquid crystal element 4013 are sealed between the first substrate 4001 and a second substrate 4006 with a sealant 4005. FIG. 4B is a cross-sectional view taken along line M-N of FIGS. 4A1 and 4A2.

The sealant 4005 is provided to surround a pixel portion 4002 and a scanning line driver circuit 4004 that are provided over the first substrate 4001. The second substrate 4006 is provided over the pixel portion 4002 and the scanning line driver circuit 4004. Therefore, the pixel portion 4002 and the scanning line driver circuit 4004 are sealed together with a liquid crystal composition 4008, by the first substrate 4001, the sealant 4005, and the second substrate 4006.

In FIG. 4A1, a signal line driver circuit 4003 that is formed using a single crystal semiconductor film or a polycrystalline semiconductor film over a substrate separately prepared is mounted in a region different from the region surrounded by the sealant 4005 over the first substrate 4001. Note that FIG. 4A2 illustrates an example in which part of the signal line driver circuit is formed using a transistor provided over the first substrate 4001. A signal line driver circuit 4003b is formed over the first substrate 4001, and a signal line driver circuit 4003a formed using a single crystal semiconductor film or a polycrystalline semiconductor film is mounted on a substrate separately prepared.

Note that there is no particular limitation on the connection method of a driver circuit which is separately formed, and COG, wire bonding, TAB, or the like can be used. FIG. 4A1 illustrates an example of mounting the signal line driver circuit 4003 by COG, and FIG. 4A2 illustrates an example of mounting the signal line driver circuit 4003 by TAB.

The pixel portion 4002 and the scanning line driver circuit 4004 provided over the first substrate 4001 each include a plurality of transistors. FIG. 4B illustrates the transistor 4010 included in the pixel portion 4002 and the transistor 4011 included in the scanning line driver circuit 4004. An insulating layer 4020 and an interlayer film 4021 are provided over the transistors 4010 and 4011.

As the transistors 4010 and 4011, the transistor which is described in Embodiment 2 or 3 can be employed.

Further, a conductive layer may be provided over the interlayer film 4021 or the insulating layer 4020 so as to overlap with a channel formation region of a semiconductor layer of the transistor 4011 for the driver circuit. The conductive layer may have the same potential as or a potential different from that of a gate electrode layer of the transistor 4011 and can function as a second gate electrode layer. Further, the potential of the conductive layer may be GND or the conductive layer may be in a floating state.

A pixel electrode layer 4030 and a common electrode layer 4031 are provided over the interlayer film 4021, and the pixel electrode layer 4030 is electrically connected to the transistor 4010. The liquid crystal element 4013 includes the pixel electrode layer 4030, the common electrode layer 4031, and the liquid crystal composition 4008. Note that a polarizing plate 4032a and a polarizing plate 4032b are provided on the outer sides of the first substrate 4001 and the second substrate 4006, respectively.

The liquid crystal composition including the polymerizable monomer represented by the general formula (G1), a nematic liquid crystal, and a chiral agent, which is described in Embodiment 1, is used as the liquid crystal composition 4008. The structures of the pixel electrode layer and the common electrode layer described in Embodiment 1 or 2 can be used for the pixel electrode layer 4030 and the common electrode layer 4031.

In this embodiment, the liquid crystal composition 4008, which exhibits a blue phase, is provided in a liquid crystal display device with a blue phase exhibited (with a blue phase shown) by being subjected to polymer stabilization treatment. Therefore, in this embodiment, the pixel electrode layer 4030 and the common electrode layer 4031 have opening patterns, as the electrode layers illustrated in FIG. 1A in Embodiment 1 or FIGS. 3A to 3D in Embodiment 2.

With an electric field generated between the pixel electrode layer 4030 and the common electrode layer 4031, liquid crystal of the liquid crystal composition 4008 is controlled. An electric field in a lateral direction is formed in the liquid crystal, so that liquid crystal molecules can be controlled using the electric field. Since the liquid crystal molecules aligned to exhibit a blue phase can be controlled in the direction parallel to the substrate, a wide viewing angle is obtained.

As the first substrate 4001 and the second substrate 4006, glass, plastic, or the like having a light-transmitting property can be used. As plastic, a polyvinyl fluoride (PVF) film, a polyester film, or an acrylic resin film can be used. A sheet with a structure in which an aluminum foil is sandwiched between PVF films or polyester films, or a fiberglass-reinforced plastics (FRP) plate can also be used.

A columnar spacer denoted by reference numeral 4035 is obtained by selective etching of an insulating film and is provided in order to control the thickness of the liquid crystal composition 4008 (a cell gap). Alternatively, a spherical spacer may be used. In the liquid crystal display device including the liquid crystal composition 4008, the cell gap which is the thickness of the liquid crystal composition is preferably greater than or equal to 1 µm and less than or equal to 20 µm. In this specification, the thickness of a cell gap refers to the maximum thickness (film thickness) of a liquid crystal composition.

Although FIGS. 4A1, 4A2, and 4B illustrate examples of transmissive liquid crystal display devices, an embodiment of the present invention can also be applied to a transflective liquid crystal display device and a reflective liquid crystal display device.

FIGS. 4A1, 4A2, and 4B illustrate examples of liquid crystal display devices in which a polarizing plate is provided on the outer side (the viewing side) of a substrate; however, the polarizing plate may be provided on the inner side of the substrate. The position of the polarizing plate may be determined as appropriate depending on the material of the polarizing plate and conditions of the manufacturing process. Furthermore, a light-blocking layer serving as a black matrix may be provided.

A color filter layer or a light-blocking layer may be formed as part of the interlayer film 4021. In FIGS. 4A2, and 4B, a light-blocking layer 4034 is provided on the second substrate 4006 side so as to cover the transistors 4010 and 4011. By providing the light-blocking layer 4034, the contrast can be more increased and the transistors can be more stabilized.

The transistors may be, but is not necessarily, covered with the insulating layer 4020 which functions as a protective film of the transistors.

Note that the protective film is provided to prevent entry of contaminant impurities such as an organic substance, metal, and moisture in the aft and is preferably a dense film. The protective film may be formed by a sputtering method to have a single-layer structure or a layered structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

Further, in the case of further forming a light-transmitting insulating layer as a planarizing insulating film, the light-transmitting insulating layer can be formed using an organic material having heat resistance, such as polyimide, acrylic, a benzocyclobutene-based resin, polyamide, or epoxy. As an alternative to such organic materials, it is possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed of these materials.

There is no particular limitation on the method for forming the insulating layer having a stacked structure, and the following method can be employed depending on the material: sputtering, spin coating, dip coating, spray coating, a droplet discharging method (such as an ink-jet method), a printing method (such as screen printing or offset printing), roll coating, curtain coating, knife coating, or the like.

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

Alternatively, the pixel electrode layer 4030 and the common electrode layer 4031 can be formed using one or more of the following: metals such as tungsten (W), molybdenum (Mo), zirconium (Zr), hafnium (H), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and nitrides thereof.

The pixel electrode layer 4030 and the common electrode layer 4031 can be formed using a conductive composition including a conductive macromolecule (also referred to as a conductive polymer).

Further, a variety of signals and potentials are supplied to the signal line driver circuit 4003 which is formed separately, the scanning line driver circuit 4004, or the pixel portion 4002 from an FPC 4018.

Further, since the transistor is easily broken by static electricity or the like, a protective circuit for protecting the driver circuits is preferably provided over the same substrate as a gate line or a source line. The protection circuit is preferably formed using a nonlinear element.

In FIGS. 4A1, 4A2, and 4B, a connection terminal electrode 4015 is formed using the same conductive film as the pixel electrode layer 4030, and a terminal electrode 4016 is formed using the same conductive film as source electrode layers and drain electrode layers of the transistors 4010 and 4011.

The connection terminal electrode 4015 is electrically connected to a terminal included in the FPC 4018 through an anisotropic conductive film 4019.

Although FIGS. 4A1, 4A2, and 4B illustrate an example in which the signal line driver circuit 4003 is formed separately and mounted on the first substrate 4001, an embodiment of the present invention is not limited to this structure. The scanning line driver circuit may be separately formed and then mounted, or only part of the signal line driver circuit or part of the scanning line driver circuit may be separately formed and then mounted.

As described above, with the use of a liquid crystal composition including the polymerizable monomer represented by the general formula (G1), a nematic liquid crystal, and a chiral agent, a liquid crystal element and a liquid crystal display device which is driven at low voltage can be provided. Thus, a liquid crystal display device with lower power consumption can be provided.

Since the liquid crystal composition including the polymerizable monomer represented by the general formula (G1), a nematic liquid crystal, and a chiral agent and exhibiting a blue phase is capable of quick response, a high-performance liquid crystal display device can be achieved.

This embodiment can be implemented in appropriate combination with any of the structures described in the other embodiments.

(Embodiment 4)

A liquid crystal display device disclosed in this specification can be applied to a variety of electronic devices (including game machines). Examples of electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a portable information terminal, an audio reproducing device, a large-sized game machine such as a pachinko machine, and the like.

Figure 5A:
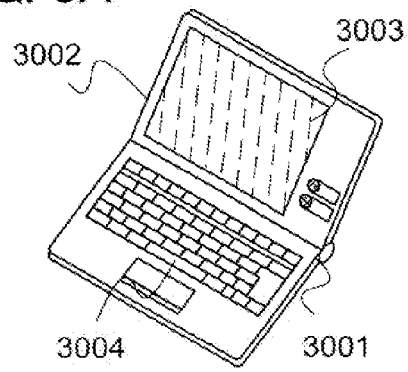
FIGS. 5A to 5F are each a view illustrating an electronic apparatus.

FIG. 5A illustrates a laptop personal computer, which includes a main body 3001, a housing 3002, a display portion 3003, a keyboard 3004, and the like. The liquid crystal display device described in any of Embodiments 1 to 3 is used for the display portion 3003, whereby a laptop personal computer with low power consumption can be provided.

Figure 5B:
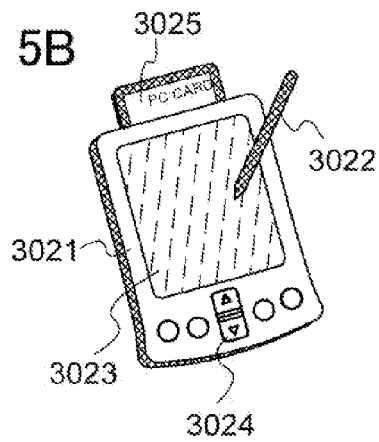

FIG. 5B illustrates a personal digital assistant (PDA), which includes a main body 3021 provided with a display portion 3023, an external interface 3025, operation buttons 3024, and the like. A stylus 3022 is provided as an accessory for operation. The liquid crystal display device described in any of Embodiments 1 to 3 is used for the display portion 3023, whereby a personal digital assistant (PDA) with low power consumption can be provided.

Figure 5C:
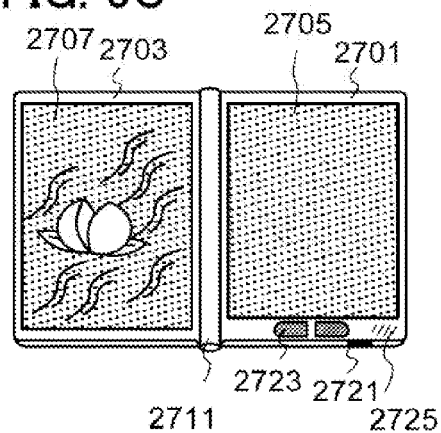

FIG. 5C illustrates an e-book reader, which includes two housings, a housing 2701 and a housing 2703. The housing 2701 and the housing 2703 are combined with a hinge 2711 so that the e-book reader can be opened and closed with the hinge 2711 as an axis. With such a structure, the e-book reader can operate like a paper book.

A display portion 2705 and a display portion 2707 are incorporated in the housing 2701 and the housing 2703, respectively. The display portion 2705 and the display portion 2707 may display one image or different images. In the structure where different images are displayed in the above display portions, for example, the right display portion (the display portion 2705 in FIG. 5C) can display text and the left display portion (the display portion 2707 in FIG. 5C) can display images. The liquid crystal display device described in any of Embodiments 1 to 3 is used for the display portions 2705 and 2707, whereby an e-book reader with low power consumption can be provided. In the case of using a transflective or reflective liquid crystal display device as the display portion 2705, the e-book reader may be used in a comparatively bright environment; therefore, a solar cell may be provided so that power generation by the solar cell and charge by a battery can be performed. When a lithium ion battery is used as the battery, there are advantages of downsizing and the like.

FIG. 5C illustrates an example in which the housing 2701 is provided with an operation portion and the like. For example, the housing 2701 is provided with a power switch 2721, operation keys 2723, a speaker 2725, and the like. With the operation keys 2723, pages can be turned. Note that a keyboard, a pointing device, or the like may also be provided on the surface of the housing, on which the display portion is provided. Furthermore, an external connection terminal (an earphone terminal, a USB terminal, or the like), a recording medium insertion portion, and the like may be provided on the hack surface or the side surface of the housing. Further, the e-hook reader may have a function of an electronic dictionary.

The e-hook reader may transmit and receive data wirelessly. Through wireless communication, desired book data or the like can be purchased and downloaded from an electronic hook server.

Figure 5D:
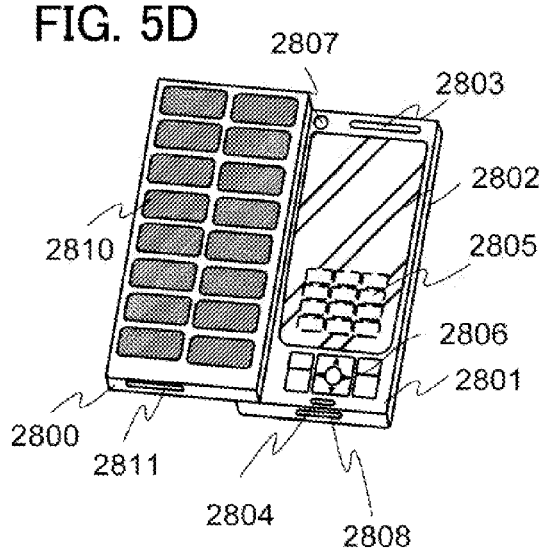

FIG. 5D illustrates a mobile phone, which includes two housings, a housing 2800 and a housing 2801. The housing 2801 includes a display panel 2802, a speaker 2803, a microphone 2804, a pointing device 2806, a camera lens 2807, an external connection terminal 2808, and the like. In addition, the housing 2800 includes a solar cell 2810 having a function of charge of the mobile phone, an external memory slot 2811, and the like. An antenna is incorporated in the housing 2801. The liquid crystal display device described in any of Embodiments 1 to 3 is used for the display panel 2802, whereby a mobile phone with low power consumption can be provided.

Further, the display panel 2802 is provided with a touch panel. A plurality of operation keys 2805 which is displayed as images is illustrated by dashed lines in FIG. 5D. Note that a boosting circuit by which a voltage output from the solar cell 2810 is increased to be sufficiently high for each circuit is also provided.

The display direction of the display panel 2802 is changed as appropriate depending on a usage pattern. Further, the camera lens 2807 is provided on the same surface as the display panel 2802, so that the mobile phone can be used as a video phone. The speaker 2803 and the microphone 2804 can be used for videophone calls, recording and playing sound, and the like as well as voice calls. Furthermore, the housings 2800 and 2801 which are developed as illustrated in FIG. 5D can overlap with each other by sliding; thus, the size of the mobile phone can be decreased, which makes the mobile phone suitable for being carried.

The external connection terminal 2808 can be connected to an AC adapter and various types of cables such as a USB cable, and charging and data communication with a personal computer are possible. Moreover, a large amount of data can be stored by inserting a storage medium into the external memory slot 2811 and can be moved.

Further, in addition to the above functions, an infrared communication function, a television reception function, or the like may be provided.

Figure 5E:
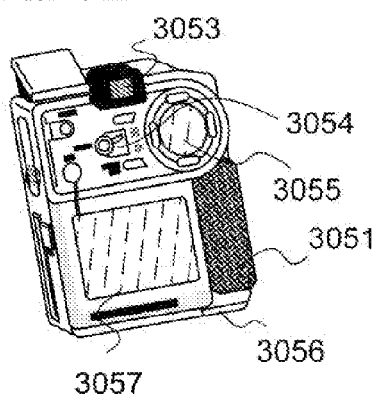

FIG. 5E illustrates a digital video camera, which includes a main body 3051, a display portion A 3057, an eyepiece 3053, an operation switch 3054, a display portion B 3055, a battery 3056, and the like. The liquid crystal display device described in any of Embodiments 1 to 3 is used for the display portion A 3057 and the display portion B 3055, whereby a digital video camera with low power consumption can be provided.

Figure 5F:
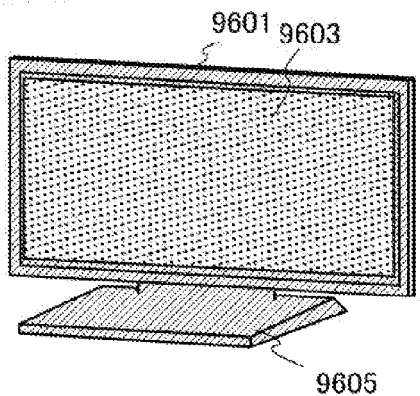

FIG. 5F illustrates a television set, which includes a housing 9601, a display portion 9603, and the like. The display portion 9603 can display images. Here, the housing 9601 is supported by a stand 9605. The liquid crystal display device described in any of Embodiments 1 to 3 is used for the display portion 9603, whereby a television set with low power consumption can be provided.

The television set can operate with an operation switch of the housing 9601 or a separate remote control device. Further, the remote controller may be provided with a display portion for displaying data output from the remote controller.

Note that the television set is provided with a receiver, a modem, and the like. With the use of the receiver, general television broadcasting can be received. Moreover, when the display device is connected to a communication network with or without wires via the modem, one-way (from a sender to a receiver) or two-way (between a sender and a receiver or between receivers) data communication can be performed.

This embodiment can be implemented in appropriate combination with any of the structures described in the other embodiments.

Example 1

In this example, an example of synthesizing 1,4-bis-[4-(3-acryloyloxy-n-propyl-1-oxy)benzoyloxy]-2-fluorobenzene (abbreviation: F-RM257-O3) represented by the structural formula (102) in Embodiment 1 will be described.

Synthesis method of 1,4-bis-[4-(3-acryloyloxy-n-propyl-1-oxy)benzoyloxy]-2-fluorobenzene (abbreviation: F-RM257-O3)

A synthesis scheme of F-RM257-O3 (abbreviation) represented by the structural formula (102) is shown in (A-1) below.

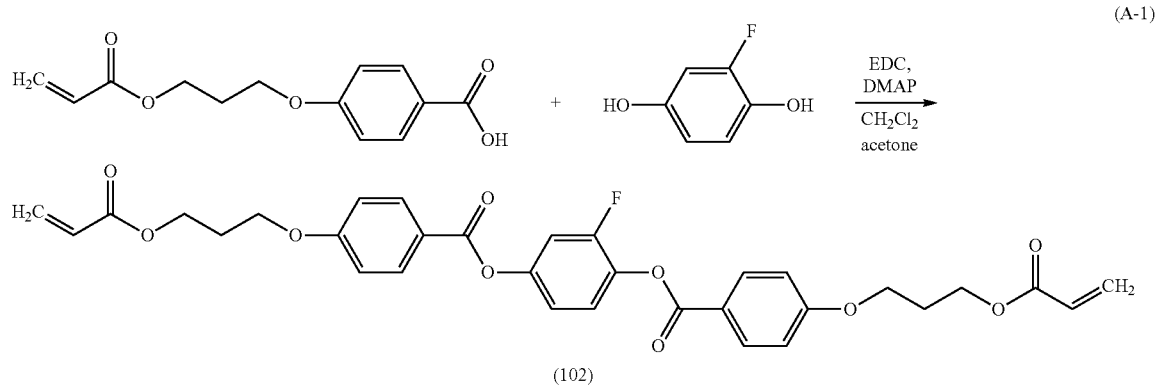

(A-1)

Into a 300-mL recovery flask were put 2.5 g (10 mmol) of 4-(3-acryloyloxy-n-propyl-1-oxy)benzoic acid, 0.51 g (4.0 mmol) of 2-fluoro-1,4-benzenediol, 0.18 g (1.5 mmol) of 4-dimethylaminopyridine (DMAP), 100 mL of acetone, and 50 mL of dichloromethane, and stirring was performed in the air. To this solution, 1.9 g mmol) of 1-ethyl-3-(3-dimethylaminopropyl)carbodiimide hydrochroride (EDC) was added, and stirring was performed in the air at room temperature for 27 hours. After that, completion of the reaction was checked using silica-gel thin layer chromatography (TLC). The obtained solution was concentrated, and chloroform, a saturated aqueous solution of sodium hydrogen carbonate, and saturated saline were added, and then, the aqueous layer was extracted three times with chloroform. An organic layer and the extracted solution were mixed and dried with magnesium sulfate, and thus obtained mixture was gravity filtered. The filtrate was condensed, and the obtained solid was purified by silica gel column chromatography (developing solvent: chloroform). The obtained fraction was concentrated to give a white solid. The white solid was purified by high performance liquid chromatography (HPLC) to give 1.9 g of a white solid in a yield of 80%.

This compound was identified by a nuclear magnetic resonance (NMR) as 1,4-bis-[4-(3-acryloyloxy-n-propyl-1-oxy)benzoyloxy]-2-fluorobenzene (abbreviation: F-RM257-O3) which was a target substance.

Figure 7A:
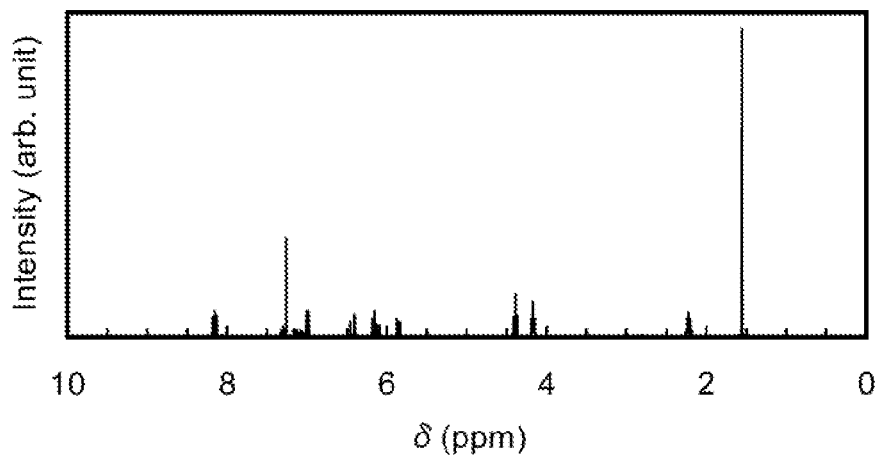
FIGS. 7A to 7C are $^1$H NMR charts of F-RM257-O3.
Figure 7B:
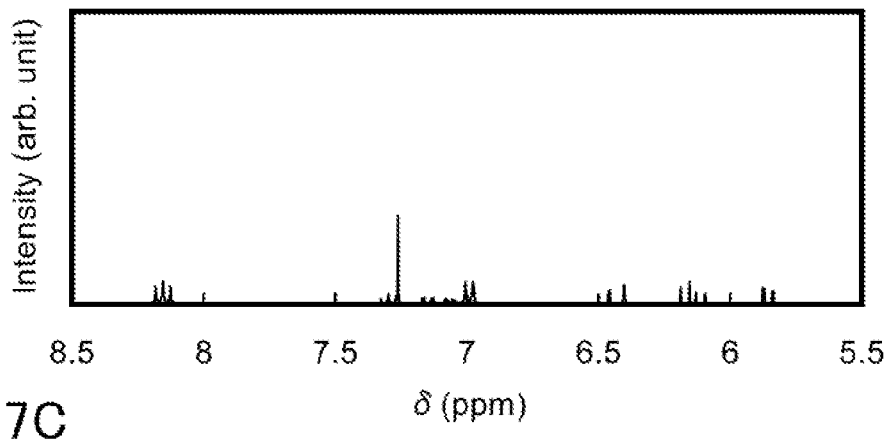
Figure 7C:
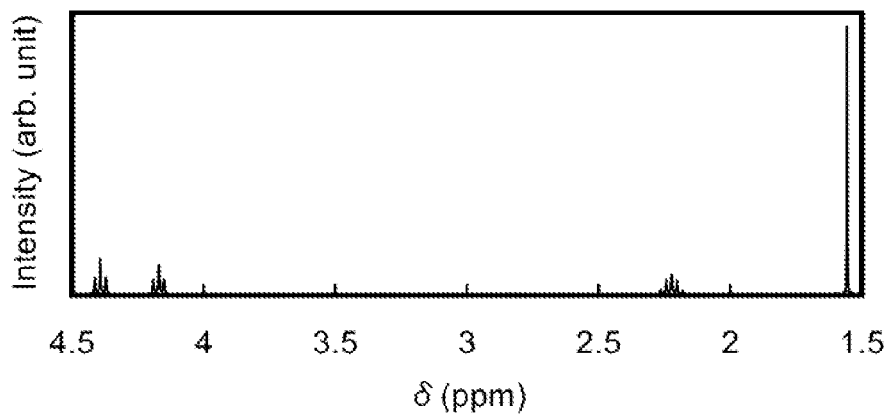

The $^1$H NMR data of the obtained substance is as follows.
$^1$H NMR (CDCl$_3$, 300 MHz): δ (ppm)=2.18-2.26 (m, 4H), 4.17 (t, J=6.0 Hz, 4H), 4.39 (t, =6.3 Hz, 4H), 5.85 (dd, J1=10.8 Hz, J2=1.5 Hz, 2H), 6.14 (dd, J1=10.5 Hz, J2=17.4 Hz, 2H), 6.43 (dd, J1=1.5 Hz, J2=17.1 Hz, 2H), 6.98-7.00 (m, 4H), 7.04-7.17 (m, 2H), 7.27-7.33 (m, H), 8.12-8.18 (m, 4H). FIGS. 7A to 7C are the NMR charts. Note that FIG. 7B is an enlarged chart showing the range of 5.5 ppm to 8.5 ppm in FIG. 7A. Note also that FIG. 7C is an enlarged chart showing the range of 1.5 ppm to 4.5 ppm in FIG. 7A.

Figure 8:
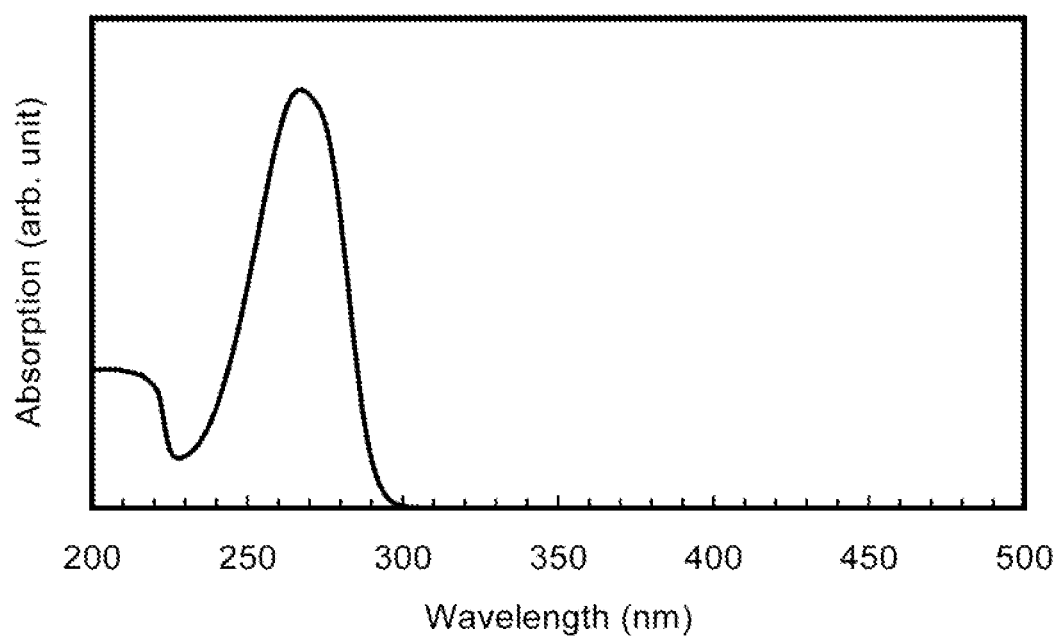
FIG. 8 shows an absorption spectrum of F-RM257-O3.

FIG. 8 shows an absorption spectrum of F-RM257-O3 in a dichloromethane solution of F-RM257-O3. The absorption spectrum was measured with an ultraviolet-visible spectrophotometer (V-550, manufactured by JASCO Corporation). The absorption spectrum in FIG. 8 was obtained by subtracting the absorption spectrum of a quartz cell filled with dichloromethane from that of the quartz cell filled with the dichloromethane solution of F-RM257-O3. In FIG. 8, the horizontal axis indicates wavelength (nm) and the vertical axis indicates absorption intensity (arbitrary unit). In the absorption spectrum, an absorption peak was observed at around 267 nm.

Example 2

In this example, an example of synthesizing 1,4-bis-[4-(4-acryloyloxy-n-butyl-1-oxy)benzoyloxy]-2-fluorobenzene (abbreviation: F-RM257-O4) represented by the structural formula (103) in Embodiment 1 will be described.

Synthesis method of 1,4-bis-[4-(4-acryloyloxy-n-butyl-1-oxy)benzoyloxy]-2-fluorobenzene (abbreviation: F-RM257-O4)

A synthesis scheme of F-RM257-O4 (abbreviation) represented by the structural formula (103) is shown in (A-2) below.

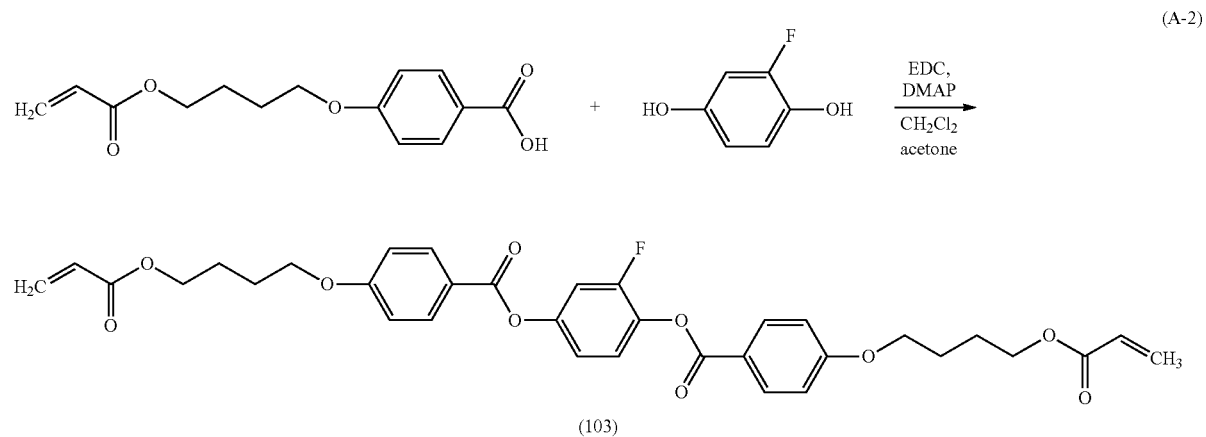 [SMILES: C=CC(=O)OCCCCOc1ccc(C(=O)O)cc1 ; Oc1ccc(O)c(F)c1 ; C=CC(=O)OCCCCOc1ccc(C(=O)Oc2ccc(OC(=O)c3ccc(OCCCCOC(=O)C=C)cc3)c(F)c2)cc1]

(A-2)

Into a 500-mL recovery flask were put 2.2 g (8.3 mmol) of 4-(4-acryloyloxy-n-butyl-1-oxy)benzoic acid, 0.43 g (3.3 mmol) of 2-fluoro-1,4-benzenediol, 0.15 g (1.3 mmol) of 4-dimethylaminopyridine (DMAP), 100 mL of acetone, and 50 mL of dichloromethane. Into this solution, 1.6 g (8.3 mmol) of 1-ethyl-3-(3-dimethylaminopropyl)carbodiimide hydrochroride (EDC) was added, and stirring was performed in the air at room temperature for 45 hours. After that, completion of the reaction was checked using silica-gel thin layer chromatography (TLC). The obtained solution was concentrated, and chloroform, a saturated aqueous solution of sodium hydrogen carbonate, and saturated saline were added, and then, the aqueous layer was extracted three times with chloroform. An organic layer and the extracted solution were mixed and dried with magnesium sulfate, and thus obtained

Example 3

In this example, an example of synthesizing 1,4-bis-[4-(4-acryloyloxy-n-pentyl-1-oxy)benzoyloxy]-2-fluorobenzene (abbreviation: F-RM257-O5) represented by the structural formula (104) in Embodiment 1 will be described.

Synthesis method of 1,4-bis-[4-(4-acryloyloxy-n-pentyl-1-oxy)benzoyloxy]-2-fluorobenzene (abbreviation: F-RM257-O5)

A synthesis scheme of F-RM257-O5 (abbreviation) represented by the structural formula (104) is shown in (A-3) below.

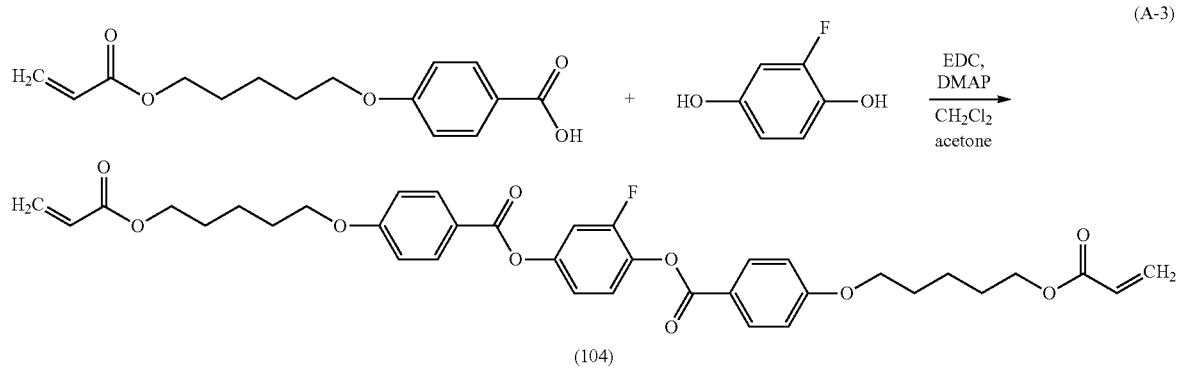

(A-3)

(104)

mixture was gravity filtered. The obtained filtrate was condensed, and the obtained solid was purified by silica gel column chromatography (developing solvent: chloroform). The obtained fraction was concentrated to give a white solid. The obtained white solid was purified by high performance liquid chromatography (HPLC) to give 0.75 g of a white solid in a yield of 37%.

This compound was identified by a nuclear magnetic resonance (NMR) as 1,4-bis-[4-(4-acryloyloxy-n-butyl-1-oxy)benzoyloxy]-2-fluorobenzene (abbreviation: F-RM257-O4) which was a target substance.

Figure 9A:
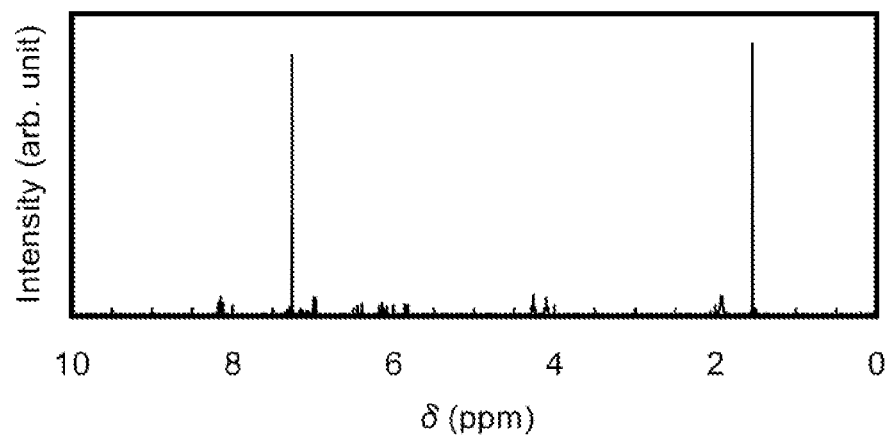
FIGS. 9A to 9C are $^1$H NMR charts of F-RM257-O4.
Figure 9B:
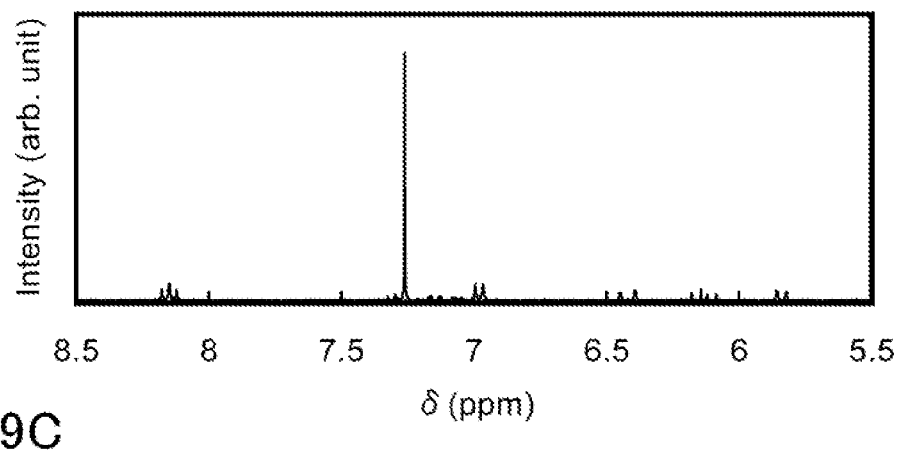
Figure 9C:
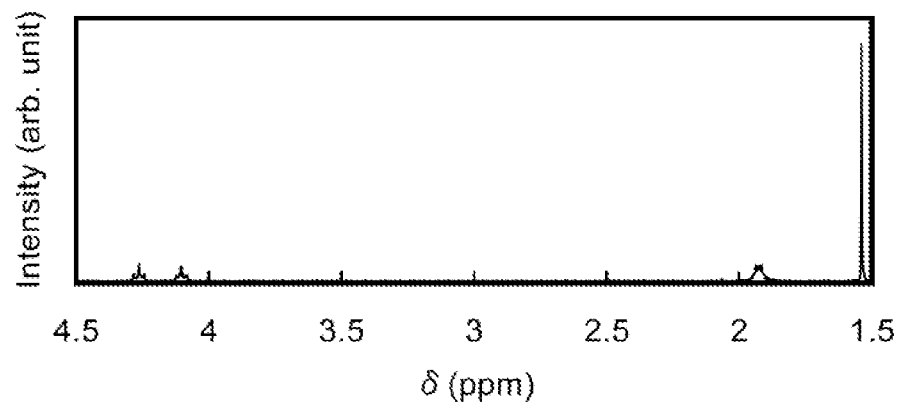

The $^1$H NMR data of the obtained substance is as follows. NMR (CDCl$_3$, 300 MHz): δ (ppm)=1.92-1.94 (m, 8H), 4.10 (t, J=5.7 Hz, 4H), 4.26 (t, J=6.0 Hz, 4H), 5.84 (dd, J1=10.7 Hz, J2=1.4 Hz, 2H), 6.13 (dd, J1=10.5 Hz, J2=17.4 Hz, 2H), 6.42 (dd, J1=1.8 Hz, J2=17.4 Hz, 2H), 6.97-6.99 (m, 4H), 7.05-7.17 (m, 2H), 7.30-7.33 (m, H), 8.12-8.18 (m, 4H). FIGS. 9A to 9C are the $^1$H-NMR charts. Note that FIG. 9B is an enlarged chart showing the range of 5.5 ppm to 8.5 ppm in FIG. 9A. Note also that FIG. 9C is an enlarged chart showing the range of 1.5 ppm to 4.5 ppm in FIG. 9A.

Figure 10:
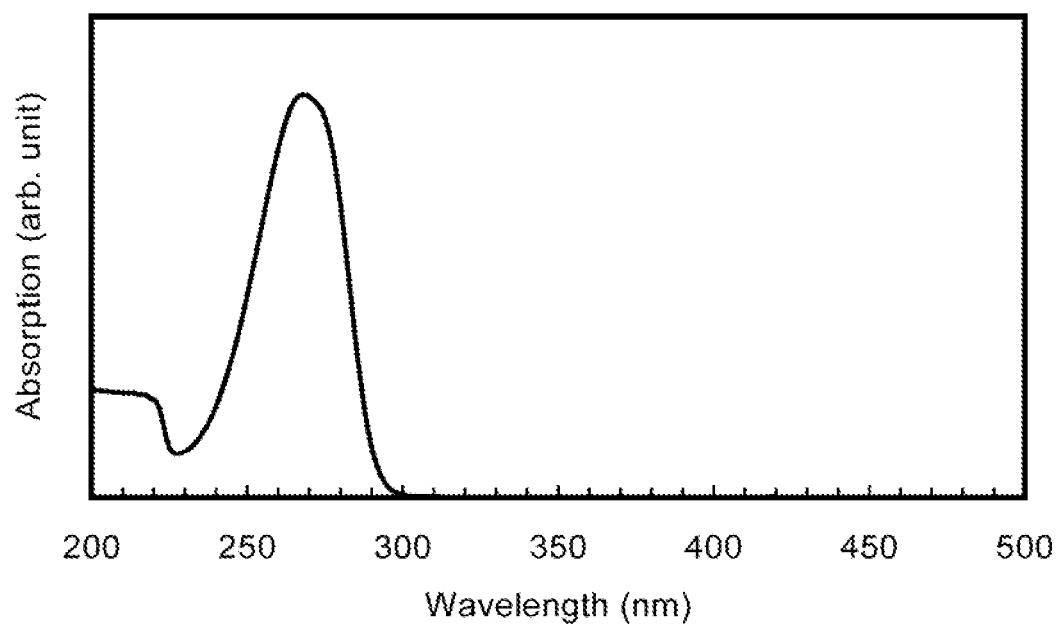
FIG. 10 shows an absorption spectrum of F-RM257-O4.

FIG. 10 shows an absorption spectrum of F-RM257-O4 in a dichloromethane solution of F-RM257-O4. The absorption spectrum was measured with an ultraviolet-visible spectrophotometer (V-550, manufactured by JASCO Corporation). The absorption spectrum in FIG. 10 was obtained by subtracting the absorption spectrum of a quartz cell filled with dichloromethane from that of the quartz cell filled with the dichloromethane solution of F-RM257-O4. In FIG. 10, the horizontal axis indicates wavelength (nm) and the vertical axis indicates absorption intensity (arbitrary unit). In the absorption spectrum, an absorption peak was observed at around 268 nm.

Into a 300-mL recovery flask were put 2.1 g (7.4 mmol) of 4-(5-acryloyloxy-n-pentyl-1-oxy)benzoic acid, 0.38 g (3.0 mmol) of 2-fluoro-1,4-benzenediol, 0.14 g (1.1 mmol) of 4-dimethylaminopyridine (DMAP), 100 mL of acetone, and 50 mL of dichloromethane. Into this solution, 1.4 g (7.4 mmol) of 1-ethyl-3-(3-dimethylaminopropyl)carbodiimide hydrochroride (EDC) was added, and stirring was performed in the air at room temperature for 19 hours. After that, completion of the reaction was checked using silica-gel thin layer chromatography (TLC). The obtained solution was concentrated, and chloroform, a saturated aqueous solution of sodium hydrogen carbonate, and saturated saline were added, and then, the aqueous layer was extracted three times with chloroform. An organic layer and the extracted solution were mixed and dried with magnesium sulfate, and thus obtained mixture was gravity filtered. The obtained filtrate was condensed, and the obtained solid was purified by silica gel column chromatography (developing solvent: chloroform). The obtained fraction was concentrated to give a white solid. The obtained white solid was purified by high performance liquid chromatography (HPLC) to give 0.75 g of a white solid in a yield of 39%.

This compound was identified by a nuclear magnetic resonance (NMR) as 1,4-bis-[4-(4-acryloyloxy-n-pentyl-1-oxy)benzoyloxy]-2-fluorobenzene (abbreviation: F-RM257-O5) which was a target substance.

Figure 11A:
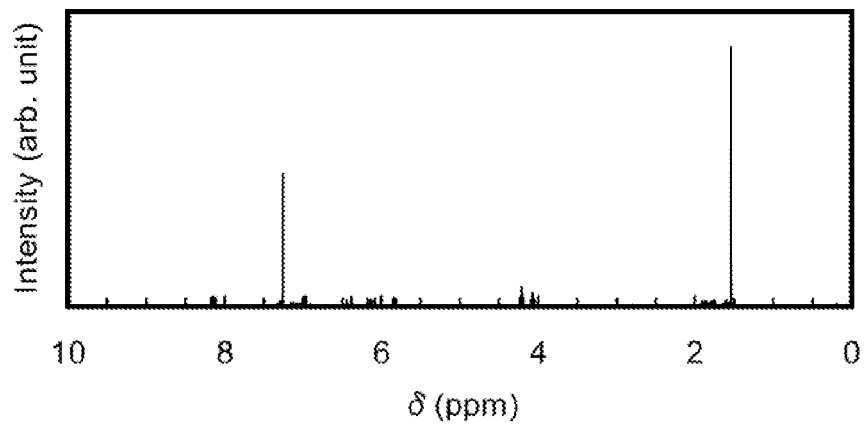
FIGS. 11A to 11C are $^1$H NMR charts of F-RM257-O5.
Figure 11B:
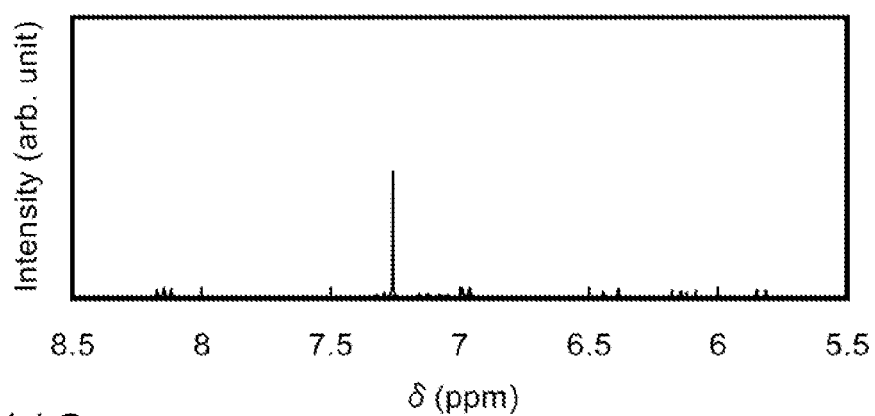
Figure 11C:
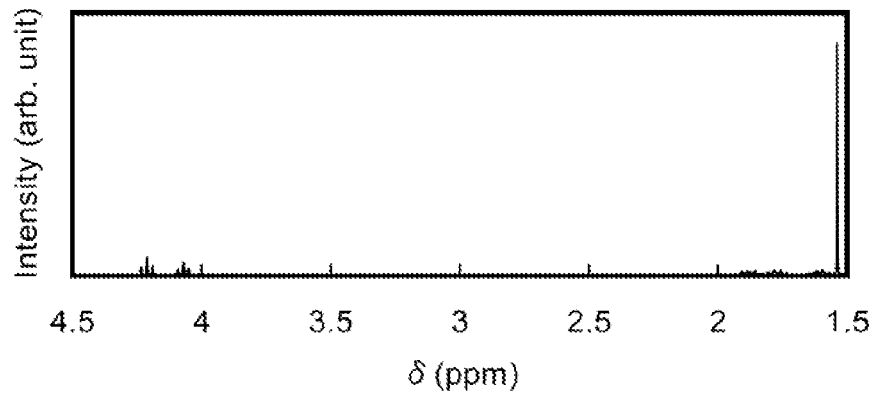

The $^1$H NMR data of the obtained substance is as follows. $^1$H NMR (CDCl$_3$, 300 MHz): $^1$H NMR (CDCl$_3$, 300 MHz): δ (ppm)=1.57-1.65 (m, 4H), 1.74-1.91(m, 8H), 4.07 (t, =6.5 Hz, 4H), 4.21 (t, J=6.3 Hz, 4H), 5.83 (dd, J1=10.2 Hz, J2=1.5 Hz, 2H), 6.13 (dd, J1=10.4 Hz, J2=17.3 Hz, 2H), 6.42 (dd, J1=1.8 Hz, J2=17.4 Hz, 2H), 6.96-6.99 (m, 4H), 7.05-7.17 (m, 2H), 7.30-7.32 (m, H), 8.12-8.17 (m, 4H). FIGS. 11A to 11C are the $^1$H NMR charts. Note that FIG. 11B is an enlarged chart showing the range of 5.5 ppm to 8.5 ppm in FIG. 11A. Note also that FIG. 11C is an enlarged chart showing the range of 1.5 ppm to 4.5 ppm in FIG. 11A.

Figure 12:
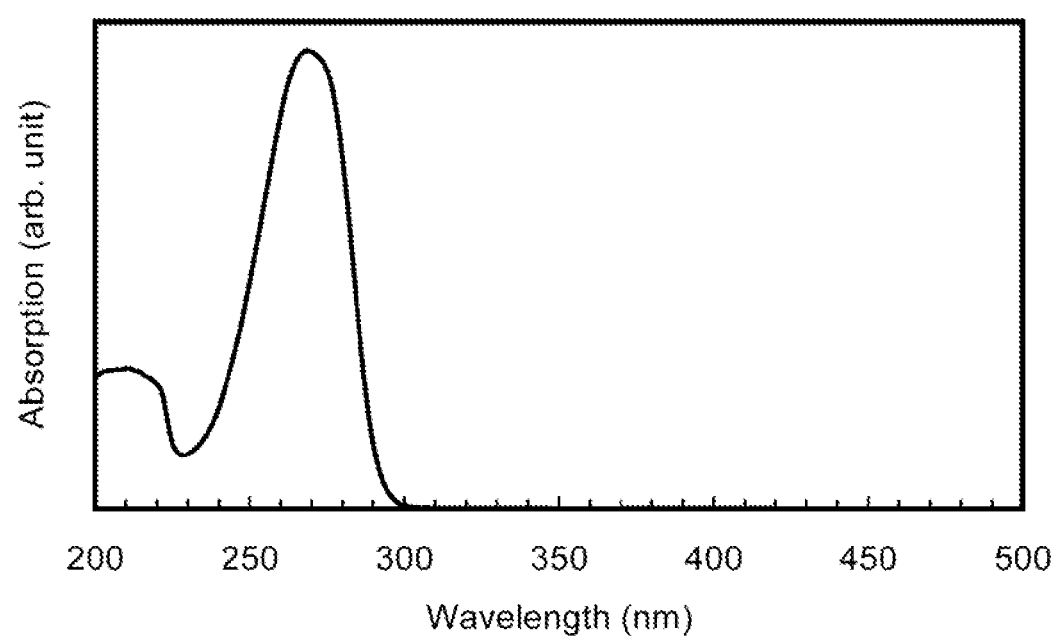
FIG. 12 shows an absorption spectrum of F-RM257-O5.

FIG. 12 shows an absorption spectrum of F-RM257-O5 in a dichloromethane solution of F-RM257-O5. The absorption spectrum was measured with an ultraviolet-visible spectrophotometer (V-550, manufactured by JASCO Corporation). The absorption spectrum in FIG. 12 was obtained by subtracting the absorption spectrum of a quartz cell filled with dichloromethane from that of the quartz cell filled with the dichloromethane solution of F-RM257-O5. In FIG. 12, the horizontal axis indicates wavelength (nm) and the vertical axis indicates absorption intensity (arbitrary unit). In the absorption spectrum, an absorption peak was observed at around 269 nm.

Example 4

In this example, an example of synthesizing 1,4-bis-[4-(4-acryloyloxy-n-hexyl-1-oxy)benzoyloxy]-2-fluorobenzene (abbreviation: F-RM257-O6) represented by the structural formula (105) in Embodiment 1 will be described.

Synthesis method of 1,4-bis-[4-(4-acryloyloxy-n-hexyl-1-oxy)benzoyloxy]-2-fluorobenzene (abbreviation: F-RM257-O6)

A synthesis scheme of F-RM257-O6 (abbreviation) represented by the structural formula (105) is shown in (A-4) below.

fraction was concentrated to give a white solid. The white solid was purified by high performance liquid chromatography (HPLC) to give 1.3 g of a white solid in a yield of 50%.

This compound was identified by a nuclear magnetic resonance (NMR) as 1,4-bis-[4-(4-acryloyloxy-n-hexyl-1-oxy)benzoyloxy]-2-fluorobenzene (abbreviation: F-RM257-O6) which was a target substance.

Figure 13A:
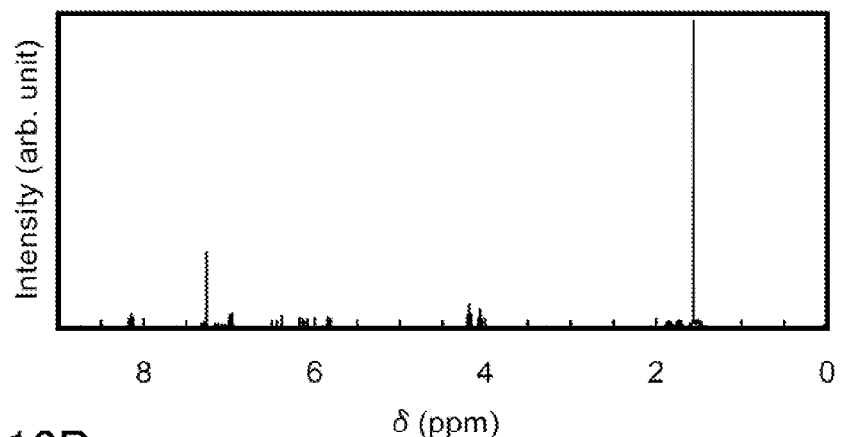
FIGS. 13A to 13C are $^1$H NMR charts of F-RM257-O6.
Figure 13B:
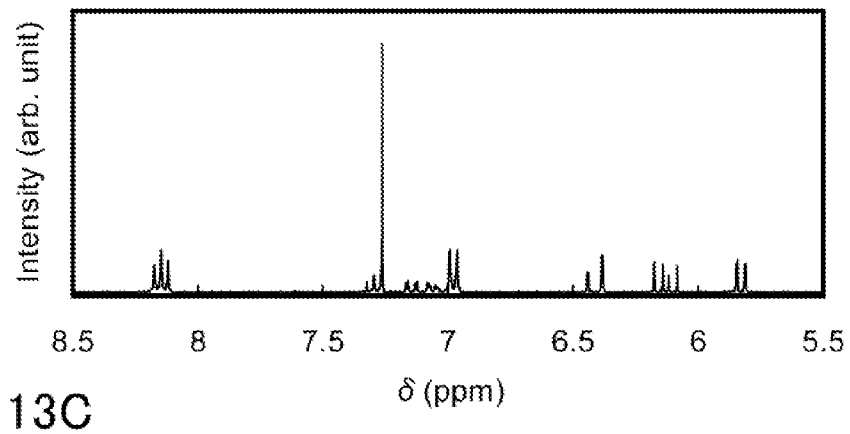
Figure 13C:
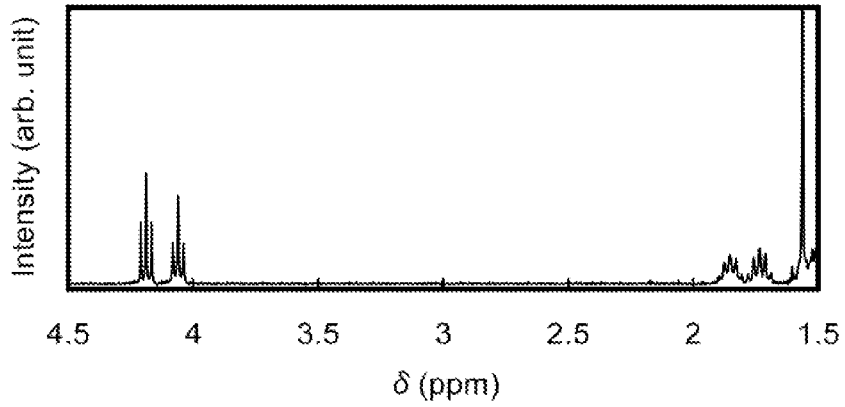

The $^1$H NMR data of the obtained substance is as follows.
$^1$H NMR (CDCl$_3$, 300 MHz): δ (ppm)=1.47-1.60 (m, 8H), 1.69-1.90 (m, 8H), 4.06 (t, J=6.3 Hz, 4H), 4.19 (t, J=6.6 Hz, 4H), 5.83 (dd, J1=10.4 Hz, J2=1.35 Hz, 2H), 6.13 (dd, J1=10.2 Hz, J2=17.7 Hz, 2H), 6.41 (dd, J1=1.8 Hz, J2=17.4 Hz, 2H), 6.96-6.99 (m, 4H), 7.05-7.17 (m, 2H), 7.30-7.32 (m, H), 8.12-8.17 (m, 4H). FIGS. 13A to 13C are the $^1$H NMR charts. Note that FIG. 13B is an enlarged chart showing the range of 5.5 ppm to 8.5 ppm in FIG. 13A. Note also that FIG. 13C is an enlarged chart showing the range of 1.5 ppm to 4.5 ppm in FIG. 13A.

Figure 14:
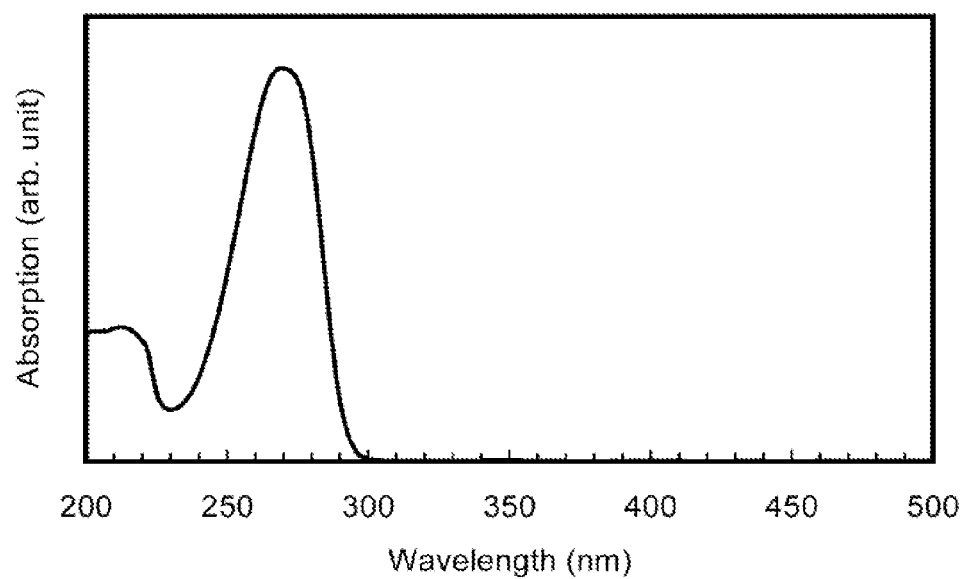
FIG. 14 shows an absorption spectrum of F-RM257-O6.

FIG. 14 shows an absorption spectrum of F-RM257-O6 in a dichloromethane solution of F-RM257-O6. The absorption spectrum was measured with an ultraviolet-visible spectrophotometer (V-550, manufactured by JASCO Corporation). The absorption spectrum in FIG. 14 was obtained by subtracting the absorption spectrum of a quartz cell filled with dichloromethane from that of the quartz cell filled with the dichloromethane solution of F-RM257-O6. In FIG. 14, the horizontal axis indicates wavelength (nm) and the vertical

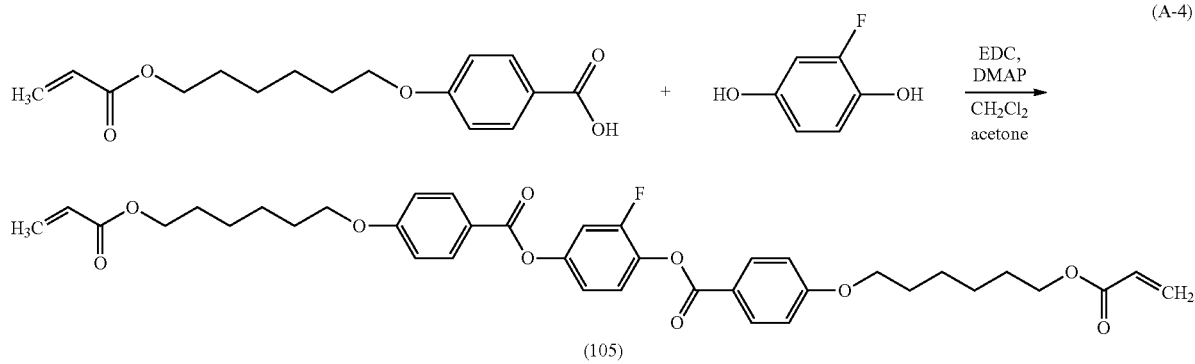

(A-4)

(105)

Into a 300-mL recovery flask were put 2.5 g (10 mmol) of 4-(6-acryloyloxy-n-hexyl-1-oxy)benzoic acid, 0.51 g (4.0 mmol) of 2-fluoro-1,4-benzenediol, 0.18 g (1.5 mmol) of 4-dimethylaminopyridine (DMAP), and 100 mL of acetone, and stirring was performed in the air. To this solution, 1.9 g (10 mmol) of 1-ethyl-3-(3-dimethylaminopropyl)carbodiimide hydrochroride (EDC) and 50 mL of dichloromethane were added, and stirring was performed in the air at room temperature for 47 hours. After that, completion of the reaction was checked using silica-gel thin layer chromatography (TLC). The obtained solution was concentrated to about 50 mL, and chloroform, a saturated aqueous solution of sodium hydrogen carbonate, and saturated saline were added, and then, the aqueous layer was extracted three times with chloroform. An organic layer and the extracted solution were mixed and dried with magnesium sulfate, and thus obtained mixture was gravity filtered. The filtrate was condensed, and the obtained solid was purified by silica gel column chromatography (developing solvent: chloroform). The obtained axis indicates absorption intensity (arbitrary unit). In the absorption spectrum, an absorption peak was observed at around 269 nm.

Example 5

In this example, an example of synthesizing 1,4-bis-[4-(4-acryloyloxy-n-heptyl-1-oxy)benzoyloxy]-2-fluorobenzene (abbreviation: F-RM257-O7) represented by the structural formula (106) in Embodiment 1 will be described.

Synthesis method of 1,4-bis-[4-(4-acryloyloxy-n-heptyl-1-oxy)benzoyloxy]-2-fluorobenzene (abbreviation: F-RM257-O7)

A synthesis scheme of F-RM257-O7 (abbreviation) represented by the structural lbrmula (106) is shown in (A-5) below.

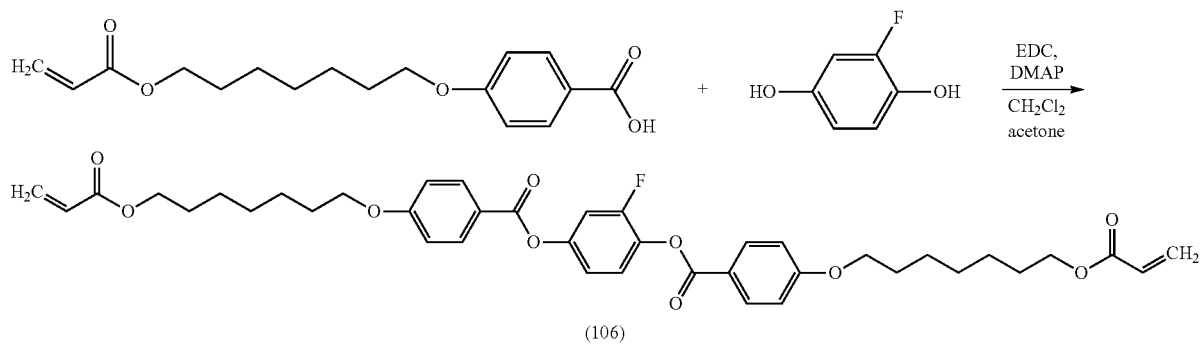

(106)

Into a 300-mL recovery flask were put 4.8 g (16 mmol) of 4-(7-acryloyloxy-n-heptyl-1-oxy)benzoic acid, 0.97 g (7.6 mmol) of 2-fluoro-1,4-benzenediol, 0.29 g (2.4 mmol) of 4-dimethylaminopyridine (DMAP), 100 mL of acetone, and 50 mL of dichloromethane. To this solution, 3.0 g (16 mmol) of 1-ethyl-3-(3-dimethylaminopropyl)carbodiimide hydrochroride (EDC) was added, and stirring was performed in the air at room temperature for 68 hours. After that, completion of the reaction was checked using silica-gel thin layer chromatography (TLC). The obtained solution was concentrated, and chloroform, a saturated aqueous solution of sodium hydrogen carbonate, and saturated saline were added, and then, the aqueous layer was extracted three times with chloroform. An organic layer and the extracted solution were mixed and dried with magnesium sulfate, and thus obtained mixture was gravity filtered. The filtrate was condensed, and the obtained solid was purified by silica gel column chromatography (developing solvent: chloroform). The obtained fraction was concentrated to give a white solid. The white solid was purified by high performance liquid chromatography (HPLC) to give 1.2 g of a white solid in a yield of 23%.

This compound was identified by a nuclear magnetic resonance (NMR) as 1,4-bis-[4-(4-acryloyloxy-n-heptyl-1-oxy)benzoyloxy]-2-fluorobenzene (abbreviation: F-RM257-O7) which was a target substance.

Figure 15A:
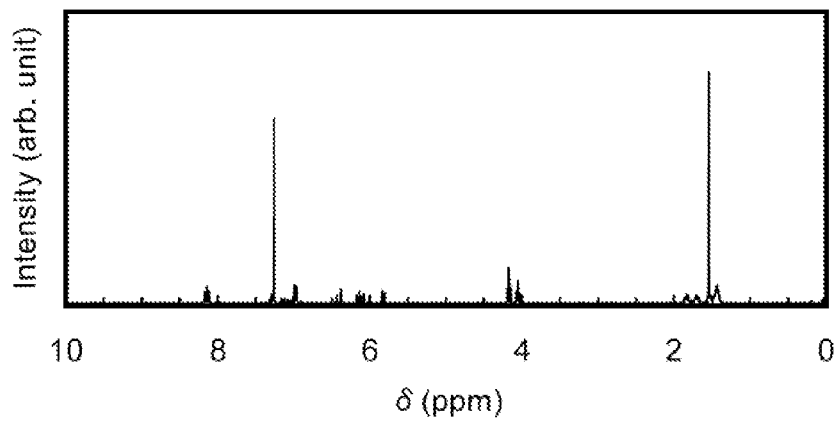
FIGS. 15A to 15C are NMR charts of F-RM257-O7.
Figure 15B:
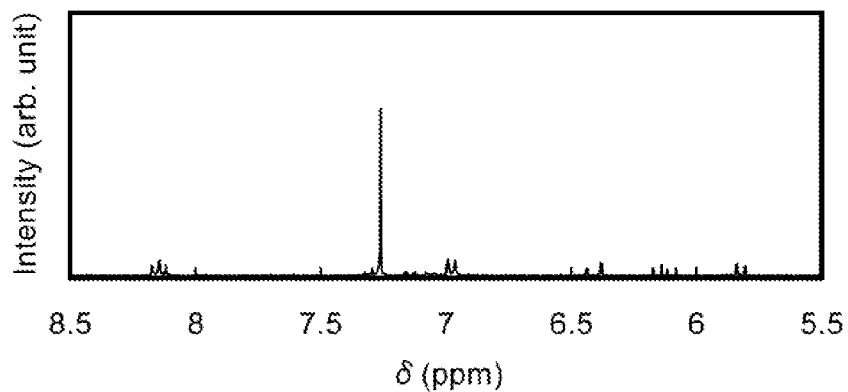
Figure 15C:
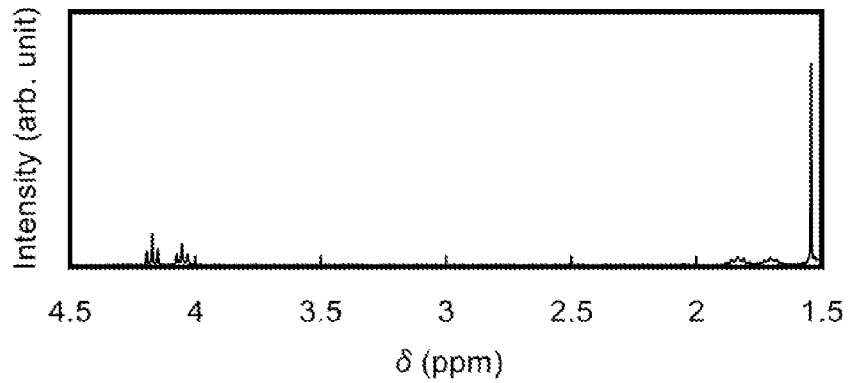

The $^1$H NMR data of the obtained substance is as follows.
$^1$H NMR (CDCl$_3$, 300 MHz): δ (ppm)=1.43-1.51 (m, 12H), 1.68-1.86 (m, 8H), 4.05 (t, J=9.8 Hz, 4H), 4.17 (t, J=6.8 Hz, 4H), 5.82 (dd, J1=10.4 Hz, J2=1.4 Hz, 2H), 6.13 (dd, J1=10.7 Hz, J2=17.3 Hz, 214), 6.41 (dd, J1=1.7 Hz, J2=17.4 Hz, 2H), 6.96-6.99 (m, 4H), 7.08-7.17 (m, 2H), 7.29-7.32 (m, H), 8.12-8.17 (m, 4H). FIGS. 15A to 15C are the $^1$H NMR charts. Note that FIG. 15B is an enlarged chart showing the range of 5.5 ppm to 8.5 ppm in FIG. 15A. Note also that FIG. 15C is an enlarged chart showing the range of 1.5 ppm to 4.5 ppm in FIG. 15A.

Figure 16:
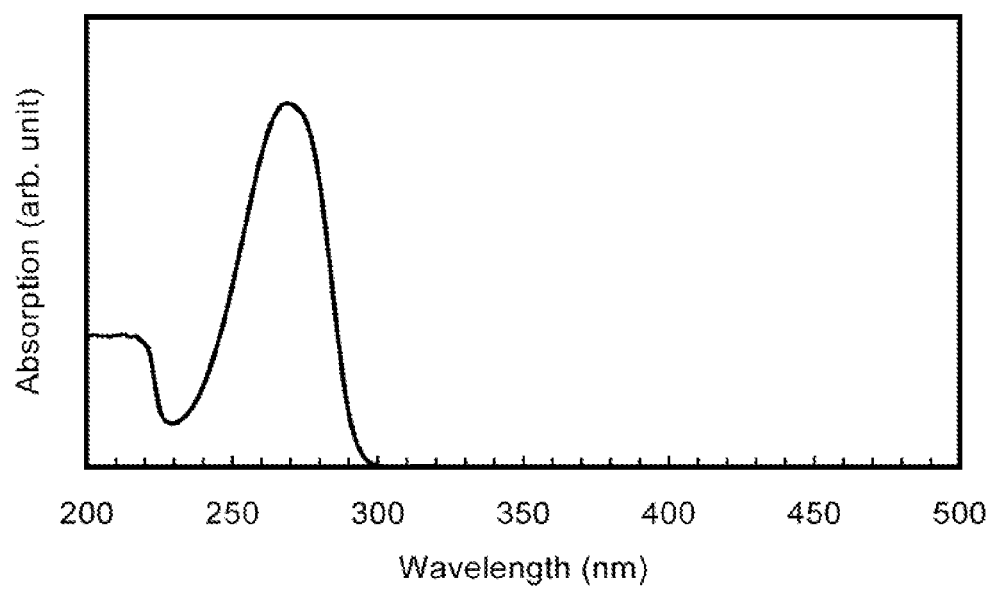
FIG. 16 shows an absorption spectrum of F-RM257-O7.

FIG. 16 shows an absorption spectrum of F-RM257-O7 in a dichloromethane solution of F-RM257-O7. The absorption spectrum was measured with an ultraviolet-visible spectrophotometer (V-550, manufactured by JASCO Corporation). The absorption spectrum in FIG. 16 was obtained by subtracting the absorption spectrum of a quartz cell filled with dichloromethane from that of the quartz cell filled with the dichloromethane solution of F-RM257-O7. In FIG. 16, the horizontal axis indicates wavelength (nm) and the vertical axis indicates absorption intensity (arbitrary unit). In the absorption spectrum, an absorption peak was observed at around 269 nm.

Example 6

In this example, liquid crystal elements (Liquid Crystal Elements 1 to 5), each of which includes a liquid crystal composition according to an embodiment of the present invention, described in Examples 1 to 5 were manufactured, and characteristics thereof were evaluated.

Tables 1 to 5 show components of liquid crystal compositions used for Liquid Crystal Elements 1 to 5 manufactured in this example. In Tables 1 to 5, the mixture ratios are all represented in weight ratios.

TABLE 1

| Components of the liquid crystal composition used for Liquid Crystal Element 1 | | Ratio (wt %) |
|---|---|---|
| Liquid Crystal 1 | E-8 | 34.1 |
| Liquid Crystal 2 | CPP-3FF | 25.4 |
| Liquid Crystal 3 | PEP-5CNF | 25.4 |
| Chiral Agent | ISO-(6OBA)$_2$ | 6.9 |
| Polymerizable Monomer | DMeAc | 4 |
| | F-RM257-O3 | 4 |
| Polymerization Initiator | DMPAP | 0.2 |
| Total | | 100.0 |

TABLE 2

| Components of the liquid crystal composition used for Liquid Crystal Element 2 | | Ratio (wt %) |
|---|---|---|
| Liquid Crystal 1 | E-8 | 34.1 |
| Liquid Crystal 2 | CPP-3FF | 25.4 |
| Liquid Crystal 3 | PEP-5CNF | 25.4 |
| Chiral Agent | ISO-(6OBA)$_2$ | 6.9 |
| Polymerizable Monomer | DMeAc | 4 |
| | F-RM257-O4 | 4 |
| Polymerization Initiator | DMPAP | 0.2 |
| Total | | 100.0 |

TABLE 3

| Components of the liquid crystal composition used for Liquid Crystal Element 3 | | Ratio (wt %) |
|---|---|---|
| Liquid Crystal 1 | E-8 | 34.1 |
| Liquid Crystal 2 | CPP-3FF | 25.4 |
| Liquid Crystal 3 | PEP-5CNF | 25.4 |
| Chiral Agent | ISO-(6OBA)$_2$ | 6.9 |
| Polymerizable Monomer | DMeAc | 4 |
| | F-RM257-O5 | 4 |
| Polymerization Initiator | DMPAP | 0.2 |
| Total | | 100.0 |

TABLE 4

| Components of the liquid crystal composition used for Liquid Crystal Element 4 | | Ratio (wt %) |
|---|---|---|
| Liquid Crystal 1 | E-8 | 34.1 |
| Liquid Crystal 2 | CPP-3FF | 25.4 |
| Liquid Crystal 3 | PEP-5CNF | 25.4 |
| Chiral Agent | ISO-(6OBA)$_2$ | 6.9 |
| Polymerizable Monomer | DMeAc | 4 |
| | F-RM257-O6 | 4 |
| Polymerization Initiator | DMPAP | 0.2 |
| Total | | 100.0 |

TABLE 5

| Components of the liquid crystal composition used for Liquid Crystal Element 5 | | Ratio (wt %) |
|---|---|---|
| Liquid Crystal 1 | E-8 | 34.1 |
| Liquid Crystal 2 | CPP-3FF | 25.4 |
| Liquid Crystal 3 | PEP-5CNF | 25.4 |
| Chiral Agent | ISO-(6OBA)$_2$ | 6.9 |
| Polymerizable Monomer | DMeAc | 4 |
| | F-RM257-O7 | 4 |
| Polymerization Initiator | DMPAP | 0.2 |
| Total | | 100.0 |

In Liquid Crystal Elements 1 to 5, the following components were used: liquid crystal mixture E-8 (produced by LCC Corporation) as Liquid Crystal 1; 4-(trans-4-n-propyl-cyclohexyl)-3',4'-difluoro-1,1'-biphenyl (abbreviation: CPP-3FF) (produced by Daily Polymer Corporation) as Liquid Crystal 2; 4-n-pentylbenzoic acid 4-cyano-3-fluorophenyl (abbreviation: PEP-5CNF) (produced by Daily Polymer Corporation) as Liquid Crystal 3; 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.) as a chiral agent; dodecyl methacrylate (abbreviation: DMeAc) (produced by Tokyo Chemical Industry Co., Ltd.) which is a non-liquid-crystalline UV polymerizable monomer as a polymerizable monomer; and DMPAP (abbreviation) (produced by Tokyo Chemical Industry Co., Ltd.) as a polymerization initiator.

The structural formulae of CPP-3FF (abbreviation) as Liquid Crystal 2, PEP-5CNF (abbreviation) as Liquid Crystal 3, ISO-(6013A)$_2$ (abbreviation) as the chiral agent, dodecyl methacrylate (DMeAc) (abbreviation) as the polymerizable monomer, and DMPAP (abbreviation) as the polymerization initiator, which were used in this example, are shown below.

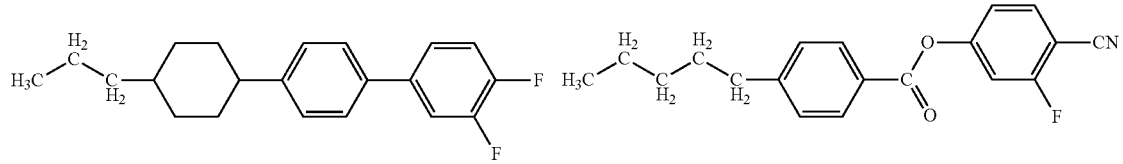

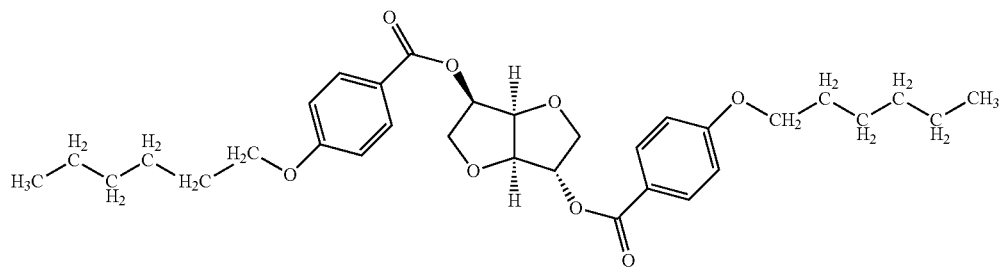

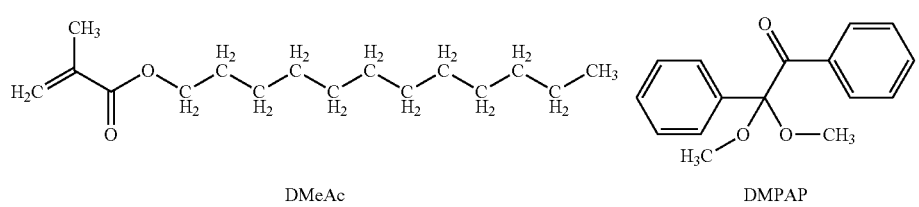

In Liquid Crystal Elements 1 to 5 shown in Tables 1 to 5, the following components were used as polymerizable monomers: F-RM257-O3 (abbreviation) which is a polymerizable monomer represented by the following structural formula (102), in Liquid Crystal Element 1; F-RM257-O4 (abbreviation) which is a polymerizable monomer represented by the following structural formula (103), in Liquid Crystal Element 2; F-RM257-O5 (abbreviation) which is a polymerizable monomer represented by the following structural formula (104), in Liquid Crystal Element 3; F-RM257-O6 (abbreviation) which is a polymerizable monomer represented by the following structural formula (105), in Liquid Crystal Element 4; and F-RM257-O7 (abbreviation) which is a polymerizable monomer represented by the following structural formula (106), in Liquid Crystal Element 5.

comb-like shapes as in FIG. 3D and a glass substrate serving as a counter substrate were bonded to each other using sealant with a space (4 μm) provided therebetween and then a liquid crystal composition obtained by mixing materials in Tables 1 to 5 stirred in an isotropic phase at ratios shown in Tables 1 to 5 was injected between the substrates by an injection method.

The pixel electrode layer and the common electrode layer were formed using indium tin oxide containing silicon oxide by a sputtering method. The thickness of each of the pixel electrode layer and the common electrode layer was 110 nm, the width thereof was 2 μm, and the distance between the pixel electrode layer and the common electrode layer was 2 μm. Further, an ultraviolet light and heat curable sealant was used as the sealant. As curing treatment, irradiation of ultra-

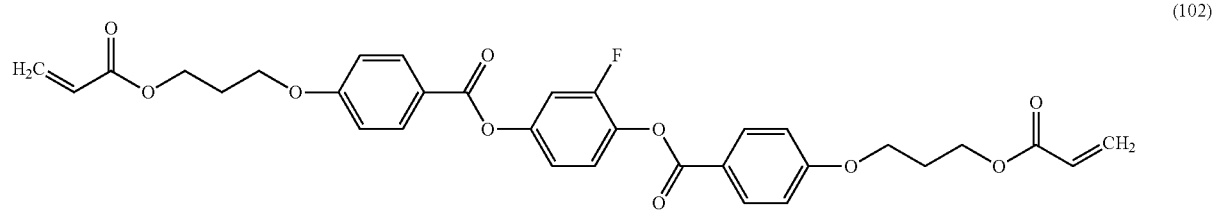

(102)

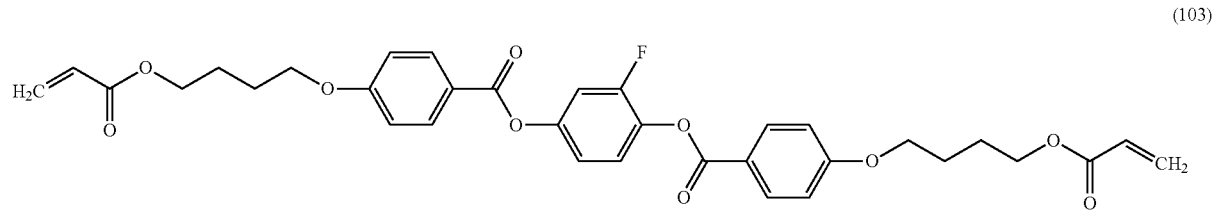

(103)

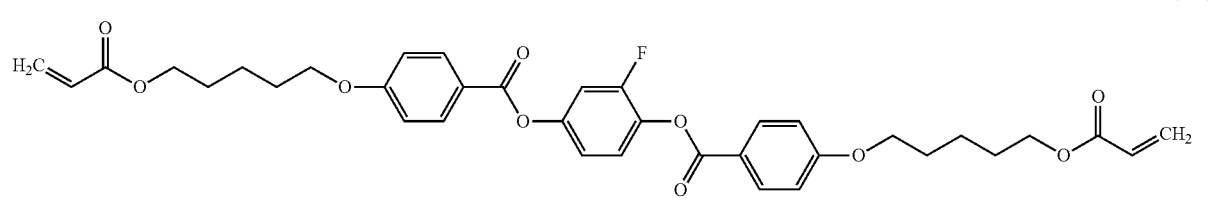

(104)

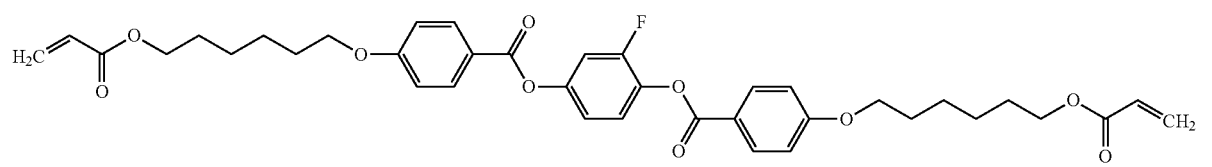

(105)

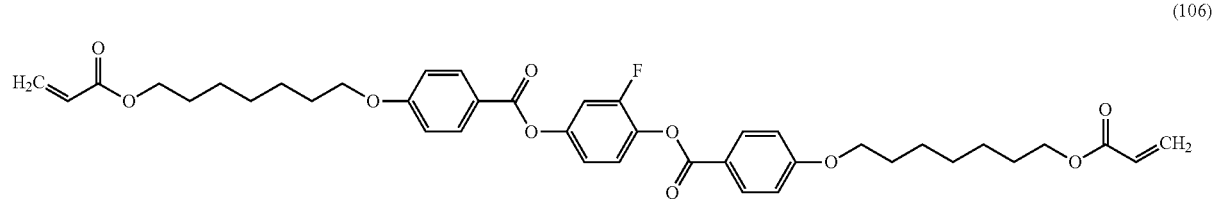

(106)

Liquid Crystal Elements 1 to 5 were each manufactured in such a manner that a glass substrate over which a pixel electrode layer and a common electrode layer were formed in violet light with an irradiance of 100 mW/cm² was performed for 90 seconds, and then, heat treatment was performed at 120° C. for 1 hour.

Further, polymer stabilization treatment was performed on each of Liquid Crystal Elements 1 to 5 in the following manner: each of Liquid Crystal Elements 1 to 5 was set at a given constant temperature within the temperature range where a blue phase is exhibited, and irradiation with an ultraviolet light (light source: a metal halide lamp, wavelength: 365 nm, irradiance: 8 mW/cm$^2$) was performed for 6 minutes.

Further, voltage was applied to Liquid Crystal Elements 1 to 5, and the transmittance with respect to an applied voltage was evaluated. The characteristic evaluation was performed with a liquid crystal evaluation system (LCD-7200 produced by Otsuka Electronics Co., Ltd.) under the following conditions: a halogen lamp was used as a light source, the temperature was set to room temperature, and Liquid Crystal Elements 1 to 5 were sandwiched between polarizers in crossed Nicols.

Figure 6:
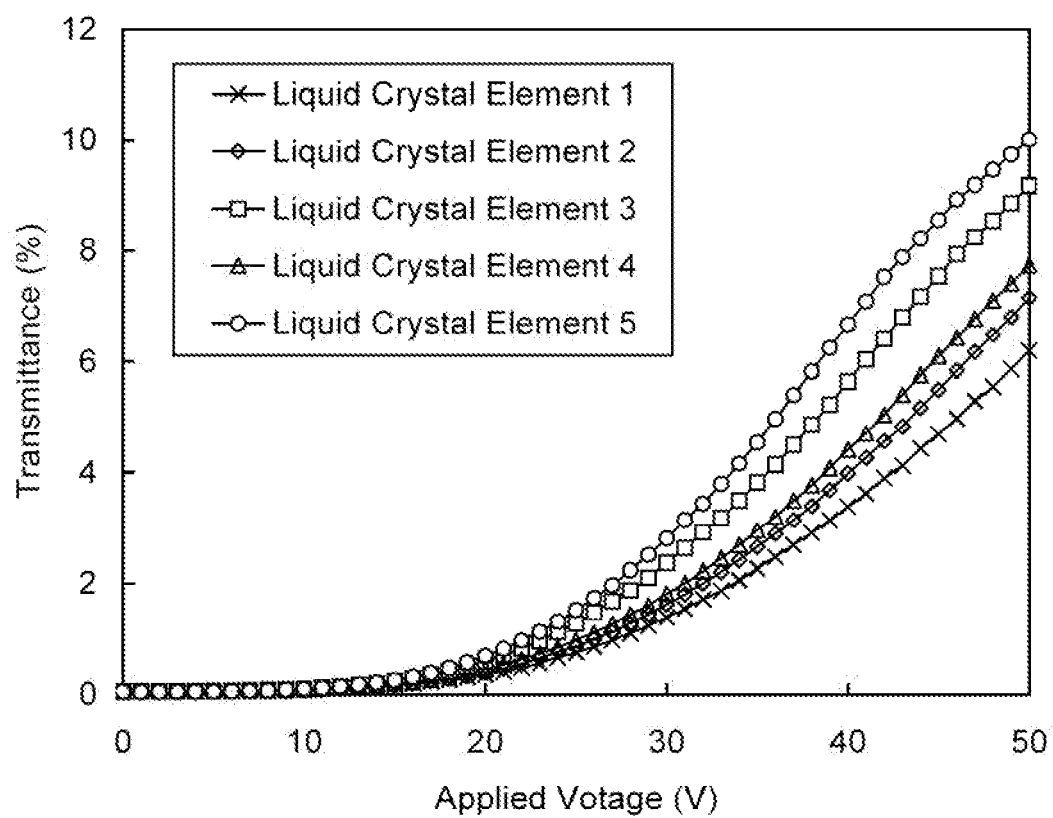
FIG. 6 shows a relation between applied voltage and transmittance of Liquid Crystal Elements 1 to 5.

FIG. 6 shows the relation between applied voltage and transmittance in Liquid Crystal Elements 1 to 5. The transmittance was measured on the condition that the intensity of the light source is 100%. Note that in FIG. 6, cross data markers, rhombus data markers, square data markers, triangle data markers, and circle data markers indicate Liquid Crystal Element 1, Liquid Crystal Element 2, Liquid Crystal Element 3, Liquid Crystal Element 4, and Liquid Crystal Element 5, respectively.

As shown in FIG. 6, it is found that each of Liquid Crystal Elements 1 to 5 has a high transmittance even at low applied voltage, so that low voltage driving of Liquid Crystal Elements 1 to 5 is possible.

Consequently, a liquid crystal element including the novel liquid crystal composition of this example can drive at low voltage; therefore, a reduction in power consumption of a liquid crystal display device and an electronic apparatus including the liquid crystal element can be achieved.

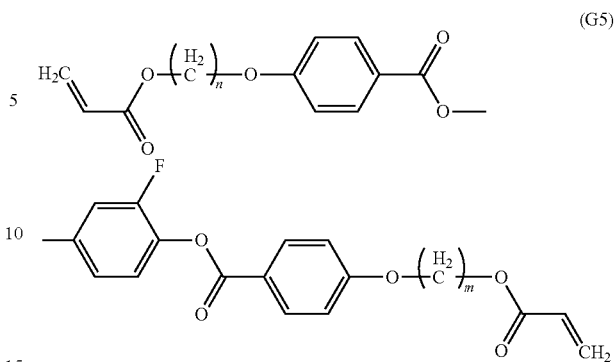

(G5)

This application is based on Japanese Patent Application serial no. 2011-104494 filed with Japan Patent Office on May 9, 2011, the entire contents of which are hereby incorporated by reference.

What is claimed is:

1. A composition comprising:
   a nematic liquid crystal compound;
   a chiral agent; and
   a polymerizable monomer represented by a formula (G5), wherein in the formula (G5), n and m are equal to each other, and one of 4, 6 and 8.

2. The composition according to claim 1, wherein the composition exhibits a blue phase.

3. A liquid crystal element comprising the composition according to claim 1.

4. A liquid crystal display device comprising the composition according to claim 1.

5. The liquid crystal element according to claim 3, wherein the composition includes an organic resin.

6. The liquid crystal display device according to claim 4, wherein the composition includes an organic resin.

7. A composition comprising:
   a nematic liquid crystal compound;
   a chiral agent; and
   a polymerizable monomer represented by a formula (103) or a formula (105),

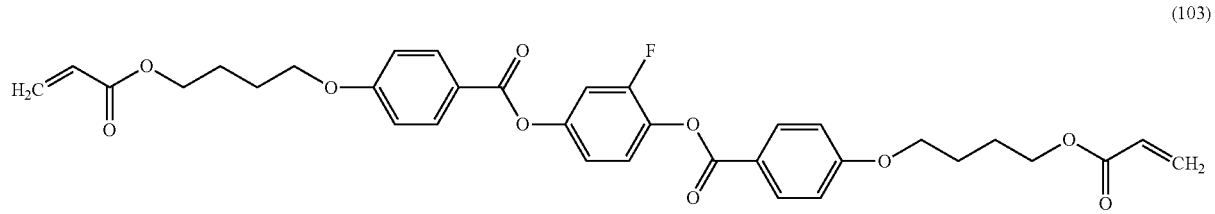

(103)

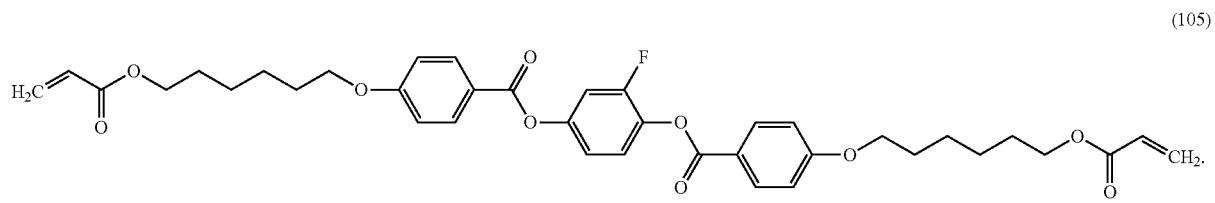

(105)

8. The composition according to claim 7, wherein the composition exhibits a blue phase.

9. A liquid crystal element comprising the composition according to claim 7.

10. A liquid crystal display device comprising the composition according to claim 7.

11. The liquid crystal element according to claim 9, wherein the composition includes an organic resin.

12. The liquid crystal display device according to claim 10, wherein the composition includes an organic resin.

* * * * *

UNITED STATES PATENT AND TRADEMARK OFFICE
CERTIFICATE OF CORRECTION

PATENT NO. : 9,011,714 B2
APPLICATION NO. : 13/464532
DATED : April 21, 2015
INVENTOR(S) : Makoto Ikenaga et al.

It is certified that error appears in the above-identified patent and that said Letters Patent is hereby corrected as shown below:

In the Specification:

Col. 2, line 35, "or" should read --of--

Col. 4, line 6, "Crystal" should read --crystal--

Col. 5, line 8, "are NMR" should read --are $^1$H NMR--

Col. 25, line 21, "esteritication" should read --esterification--

Col. 31, line 57, "446h" should read --446b--

Col. 32, line 35, "of" should read --offset--

Col. 33, line 12, "443h" should read --443b--

Col. 34, line 39, "(TES)" should read --TEOS--

Col. 34, line 40, "tetramethylsilane" should read --tetramethylsilane (TMS)--

Col. 35, line 15, "O-hased" should read --O-based--

Col. 37, line 33, "(TAR)" should read --TAB--

Col. 37, line 35, "TAR" should read --TAB--

Col. 39, line 34, "aft" should read --air--

Col. 40, line 2, "(H)" should read --Hf--

Col. 41, line 45, "hack" should read --back--

Col. 41, line 46, "e-hook" should read --e-book--

Signed and Sealed this
Tenth Day of May, 2016

Michelle K. Lee
*Director of the United States Patent and Trademark Office*

CERTIFICATE OF CORRECTION (continued)
U.S. Pat. No. 9,011,714 B2

In the Specification:

Col. 41, line 47, "e-hook" should read --e-book--

Col. 41, line 50, "e-hook" should read --e-book--

Col. 43, line 23, "1.9 g mmol)" should read --1.9 g (10 mmol)--

Col. 43, line 46, "t, =6.3 Hz, 4H)," should read --t, J=6.3Hz, 4H,--

Col. 44, line 20, "the NMR" should read --the $^1$H NMR--

Col. 45, line 46, "NMR" should read --$^1$H NMR--

Col. 46, line 62, "t, =6.5 Hz, 4H)," should read --t, J=6.5 Hz, 4H),--

Col. 48, line 66, "lbrmula" should read --formula--

Col. 49, line 45, "J2=17.3 Hz,214)," should read --J2=17.3 Hz, 2H),--

Col. 52, line 25, "ISO-(6013A)$_2$" should read --ISO-(60BA)$_2$--